(12) United States Patent
White

(10) Patent No.: US 8,826,447 B2
(45) Date of Patent: *Sep. 2, 2014

(54) INTELLIGENT CONNECTORS INTEGRATING MAGNETIC MODULAR JACKS AND INTELLIGENT PHYSICAL LAYER DEVICES

(71) Applicant: Marvell World Trade Ltd., St. Michael (BB)

(72) Inventor: Martin White, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,966

(22) Filed: Oct. 9, 2012

(65) Prior Publication Data

US 2013/0091579 A1    Apr. 11, 2013

Related U.S. Application Data

(60) Provisional application No. 61/545,544, filed on Oct. 10, 2011.

(51) Int. Cl.
*H04L 12/56* (2006.01)
*G06F 21/00* (2013.01)

(52) U.S. Cl.
USPC ............................................. 726/26; 370/401

(58) Field of Classification Search
None
See application file for complete search history.

(56) References Cited

U.S. PATENT DOCUMENTS

| 2006/0206936 | A1 | 9/2006 | Liang et al. |
| 2007/0056029 | A1* | 3/2007 | Kay ................................ 726/11 |
| 2007/0157306 | A1 | 7/2007 | Elrod et al. |
| 2007/0261112 | A1 | 11/2007 | Todd et al. |
| 2008/0155157 | A1* | 6/2008 | Lee ............................... 710/301 |
| 2008/0298392 | A1* | 12/2008 | Sanchez et al. ............... 370/469 |
| 2009/0210603 | A1* | 8/2009 | Chen et al. .................... 710/305 |
| 2010/0230825 | A1* | 9/2010 | von Kaenel ................... 257/777 |
| 2011/0035580 | A1 | 2/2011 | Wang et al. |

FOREIGN PATENT DOCUMENTS

EP    2348677 A1    7/2011

OTHER PUBLICATIONS

Notification of Transmittal of the International Search Report and The Written Opinion of The International Searching Authority, or The Declaration dated Jan. 30, 2013 in reference to PCT/US2012/059436 (12 pgs).
PCT International Search Report for PCT Application No. PCT/US2012/050373 dated Feb. 14, 2013, 3 pages.

* cited by examiner

*Primary Examiner* — Andrew Nalven
*Assistant Examiner* — Christopher Ruprecht

(57) ABSTRACT

An apparatus comprises a connector, wherein the connector comprises i) a jack, wherein the jack comprises a) a plurality of electrical terminals, and b) a magnetic component electrically coupled to the plurality of electrical terminals; and ii) a physical layer device, wherein the physical layer device comprises a) a physical layer module, wherein the physical layer module comprises an interface configured to receive packets from the jack, and an interface bus configured to inspect the packets, and b) a network interface configured to, based on the inspection of the packets by the interface bus, provide the packets to a device separate from the physical layer device.

20 Claims, 13 Drawing Sheets

INTELLIGENT CONNECTORS INTEGRATING MAGNETIC MODULAR JACKS AND INTELLIGENT PHYSICAL LAYER DEVICES

CROSS-REFERENCE TO RELATED APPLICATIONS

This disclosure claims the benefit of U.S. Provisional Patent Application Ser. No. 61/545,544, filed on Oct. 10, 2011, entitled "iPhy in Magjack," the disclosure thereof incorporated by reference herein in its entirety.

This disclosure is related to U.S. Non-Provisional patent application Ser. No. 13/571,870, filed on Aug. 10, 2012, entitled "INTELLIGENT PHY WITH SECURITY DETECTION FOR ETHERNET NETWORKS."

FIELD

The present disclosure relates generally to the field of network communications. More particularly, the present disclosure relates to connectors and physical layer devices for network communications.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

It is common in high-speed data communications networks to include modular jacks, such as RJ45 jacks, in network equipment. These modular jacks allow the network equipment to be interconnected quickly, easily, and reliably using network cables such as Ethernet cables. Some of these modular jacks, referred to herein as "magnetic modular jacks," include integrated magnetic components, such as transformers and the like, that were formerly implemented outside the modular jack, for example on a printed circuit board on which the modular jack is mounted. These magnetic components several purposes, including providing signal integrity, protecting physical layer devices, and providing DC isolation. Some magnetic modular jacks also support Power over Ethernet (PoE) technology, which provides electrical power, along with data, over the network cabling.

FIG. 1 shows a conventional access chassis 1000 that includes modular magnetic jacks. The access chassis 1000 provides connections between network devices and/or between the network devices and the Internet. The access chassis 1000 includes at least one line card 1002, and at least one fabric card 1004. The line cards 1002 and fabric cards 1004 are generally implemented as printed circuit boards.

Each of the fabric cards 1004 can be connected to each of the line cards 1002 by a cable 1022 and respective backplane connectors 1024 and 1026. The line cards 1002 are connected to network devices 1006 via an Ethernet network 1008. Predetermined ports or uplink ports of one or more of the line cards 1002 may be connected to the Internet 1010. The fabric cards 1004 provide connections between the line cards 1002. The line cards 1002 provide connections between the network devices 1006 and the fabric cards 1004 and/or between the fabric cards 1004 and the Internet 1010.

Each of the fabric cards 1004 typically includes an aggregation switch 1012 and a central control module 1014. The aggregation switch 1012 provides connections between the line cards 1002. The central control module 1014 controls states of the connections, and the transfer of packets between the line cards 1002. Each of the line cards 1002 typically includes an access switch 1016 and multiple physical layer (PHY) devices 1018. The access switch 1016 provides connections between the aggregation switch 1012 located on the fabric card 1004 and the PHY devices 1018 located on the line card 1002. Each of the PHY devices 1018 is connected to a respective modular magnetic jack 1020 mounted on the line card 1002.

SUMMARY

In general, in one aspect, an embodiment features an apparatus comprising a connector, wherein the connector comprises i) a jack, wherein the jack comprises a) a plurality of electrical terminals, and b) a magnetic component electrically coupled to the plurality of electrical terminals; and ii) a physical layer device, wherein the physical layer device comprises a) a physical layer module, wherein the physical layer module comprises an interface configured to receive packets from the jack, and an interface bus configured to inspect the packets, and b) a network interface configured to, based on the inspection of the packets by the interface bus, provide the packets to a device separate from the physical layer device.

Embodiments of the apparatus can include one or more of the following features. Some embodiments comprise a line panel, wherein the line panel comprises a backplane connector disposed upon the line panel, and at least one of the connectors, wherein each of the connectors is disposed upon the line panel, and wherein the network interface of each of the connectors is coupled to the backplane connector by a respective communications cable. In some embodiments, the line panel comprises at least one of: a patch panel; and a metal plate. In some embodiments, the connector further comprises a Power over Ethernet (PoE) circuit configured to: receive power over a power lead; and provide power to the jack for transmission over the electrical terminals of the jack. In some embodiments, the connector further comprises a DC-to-DC converter configured to: receive a single DC voltage over a power lead; generate multiple different DC voltages based on the single DC voltage; and provide the multiple different DC voltages to the physical layer device. In some embodiments, the connector further comprises: an integrated circuit, wherein the integrated circuit comprises the physical layer device; and a printed circuit board, wherein the integrated circuit is disposed upon the printed circuit board. In some embodiments, the physical layer device further comprises: memory; and a memory control module configured to control access to the memory; wherein the physical layer module is configured to store the packets in the memory via the memory control module; and wherein the interface bus comprises at least one of a control module and a regular expression module, wherein the at least one of the control module and the regular expression module is configured to inspect the packets to determine a security level of the packets. In some embodiments, the physical layer device is implemented in a first system-in-a-package; the memory is implemented in a second system-in-a-package; and the first system-in-a-package and the second system-in-a-package are stacked. In some embodiments, the at least one of the control module and the regular expression module is configured to determine the security level of each of the packets to be one of: valid, a packet to be further inspected via the at least one of the control module and the regular expression module, a packet to be tunneled to a central control module for further inspection, wherein the central control module is separate from the physical layer device, and invalid. In some embodiments, each of the packets having a security level of valid is forwarded from the physical layer device to the device separate from the physical layer module; and each of the packets having a security level of invalid is dropped. In some embodiments, the device separate from the physical layer device is an aggregation switch of a fabric card; and the physical layer module is in communication with the fabric card. In some embodiments, the network interface is configured to provide selected ones of the packets to a central control module; the central control module is separate from the physical layer device; and the network interface is configured to forward packets other than the selected ones of the packets based on the inspection of the selected ones of the packets performed by the central control module. In some embodiments, the physical layer module is a first physical layer module; the physical layer device further comprises a second physical layer module; and the second physical layer module shares the memory with the first physical layer module. In some embodiments, the physical layer module further comprises: a first module configured to inspect the packets to generate a first command signal; a second module configured to inspect the packets to generate a second command signal; wherein the at least one of the control module and the regular expression module is configured to inspect the packets and generate a third command signal; and a security level module configured to generate a security level signal based on the first command signal; the second command signal; and the third command signal; wherein the network interface; based on the security level signal; provides the packets to the device separate from the physical layer device. In some embodiments, the physical layer module comprises a plurality of modules; each of the plurality of modules is configured to inspect the packets and generate a plurality of security level estimates; a security level module configured to generate a security level signal based on the plurality of security level estimates; and based on the security level signal, the network interface is configured to provide the packets to the device separate from the physical layer device. In some embodiments, the network interface is configured to provide selected ones of the packets to a central control module for inspection; the central control module is separate from the physical layer device; and the physical layer module is configured to receive an instruction signal from the central control module based on the inspection performed at the central control module and forward packets other than the selected ones of the packets based on the instruction signal. Some embodiments comprise an access chassis comprising: a plurality of the line panels; and at least one fabric card configured to provide switch connections between the line panels. In some embodiments, the at least one fabric card comprises a central control module; one of an ingress module and an egress module of the physical layer module is configured to determine whether selected ones of the packets are to be inspected by the central control module; and the central control module is configured to inspect the selected ones of the packets based on the determination of whether the selected ones of the packets are to be inspected by the central control module. In some embodiments, the central control module is configured to generate an instruction signal indicating whether to drop or forward packets having a similar format as the selected ones of the packets; and based on the instruction signal, the physical layer device is configured to drop or forward the packets having a similar format as the selected ones of the packets. Some embodiments comprise a single printed circuit board; and an aggregation switch, wherein the aggregation switch is disposed upon the single printed circuit board; wherein the connector is disposed upon the single printed circuit board; and wherein the network interface is in communication with the aggregation switch.

The details of one or more implementations are set forth in the accompanying drawings and the description below. Other features will be apparent from the description and drawings, and from the claims.

DETAILED DESCRIPTION

Embodiments of the present disclosure provide connectors integrating magnetic modular jacks and physical layer devices. Some embodiments of the present disclosure provide intelligent jacks integrating magnetic modular jacks and intelligent physical layer devices. The present disclosure describes these connectors in the context of an access chassis. However, various embodiments can be implemented in other form factors, for example such as a pizza box form factor and the like.

Figure 2:
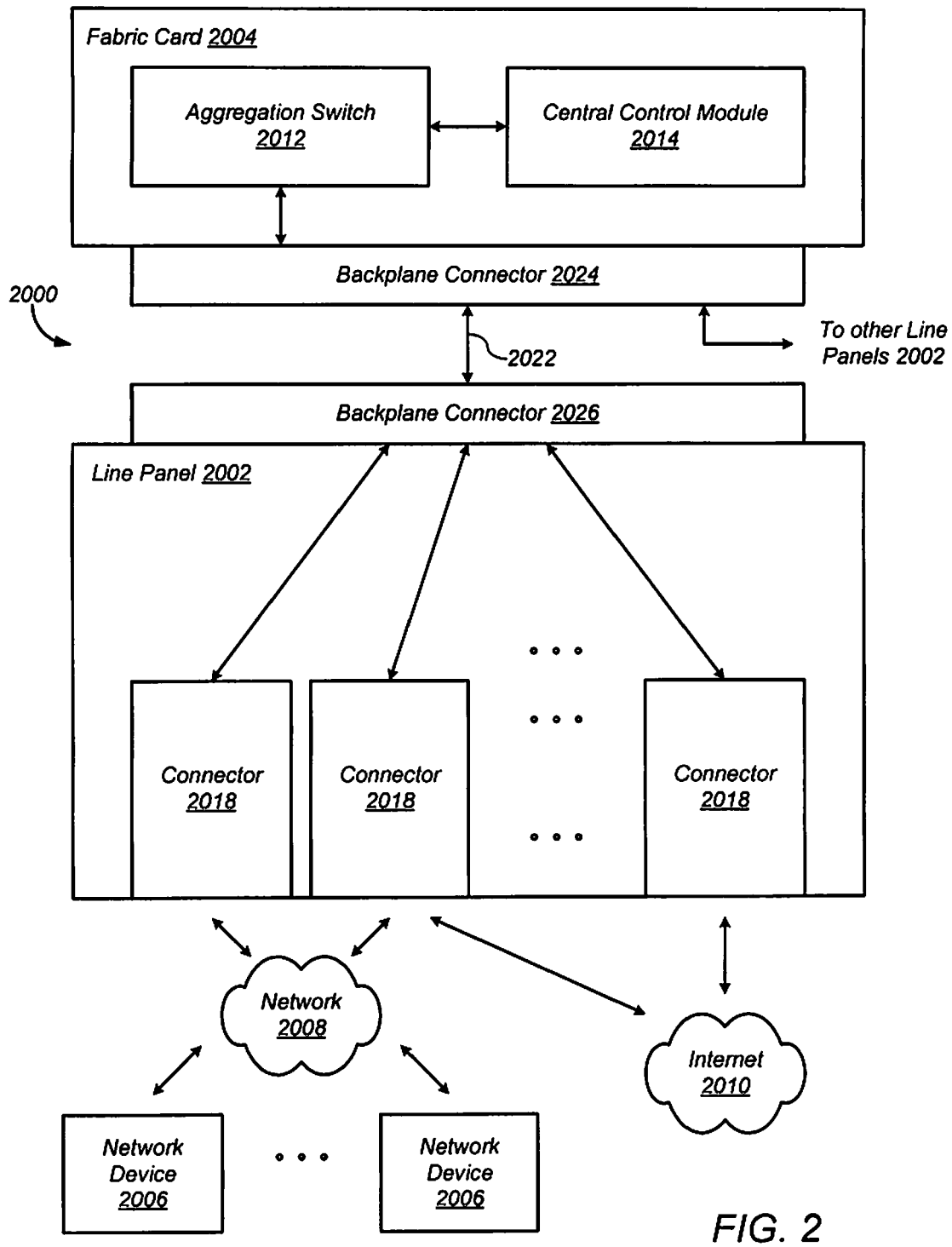
FIG. 2 shows an access chassis according to one embodiment.

FIG. 2 shows an access chassis 2000 according to one embodiment. The access chassis 2000 provides connections between network devices and/or between the network devices and the Internet. The access chassis 2000 includes at least one line panel 2002, and at least one fabric card 2004. Each of the line panels 2002 can be fabricated as a metal plate, patch panel, or the like. Each of the fabric cards 2004 can be implemented as a printed circuit board. The line panels 2002 can be deployed in the same chassis as the fabric cards 2004, or in different chassis. Each of the fabric cards 2004 can be connected to each of the line panels 2002 by a cable 2022 and respective backplane connectors 2024 and 2026. The cable 2022 can be an electrical cable, an optical cable, or the like. The line panels 2002 are connected to network devices 2006 via an Ethernet network 2008. Predetermined ports or uplink ports of one or more of the panels 2002 may be connected to the Internet 2010. The fabric cards 2004 provide connections between the line panels 2002. The line panels 2002 provide connections between the network devices 2006 and the fabric cards 2004 and/or between the fabric cards 2004 and the Internet 2010.

Figure 6:
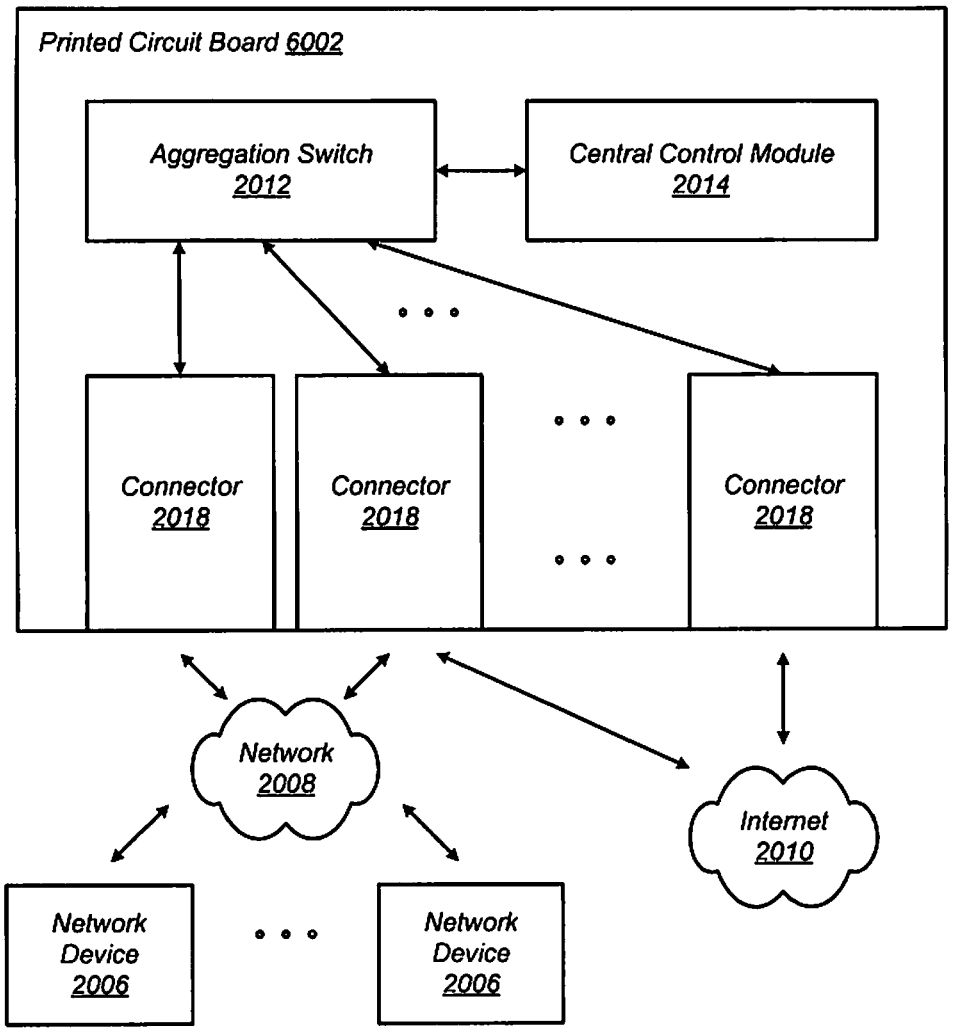
FIG. 6 shows an implementation featuring a single printed circuit board.

Each of the fabric cards 2004 typically includes an aggregation switch 2012 and a central control module 2014. The aggregation switch 2012 provides connections between the line panels 2002. The central control module 2014 controls states of the connections, and the transfer of packets between the line panels 2002. Each of the panels 2002 includes one or more connectors 2016. In other implementations the aggregation switch 2012, the central control module 2014, and the connectors 2016 are implemented on a single printed circuit board 6002, as shown in FIG. 6. The printed circuit board 6002 can be implemented, for example, in a pizza box form factor or the like. An example connector is shown in FIG. 3.

Figure 3:
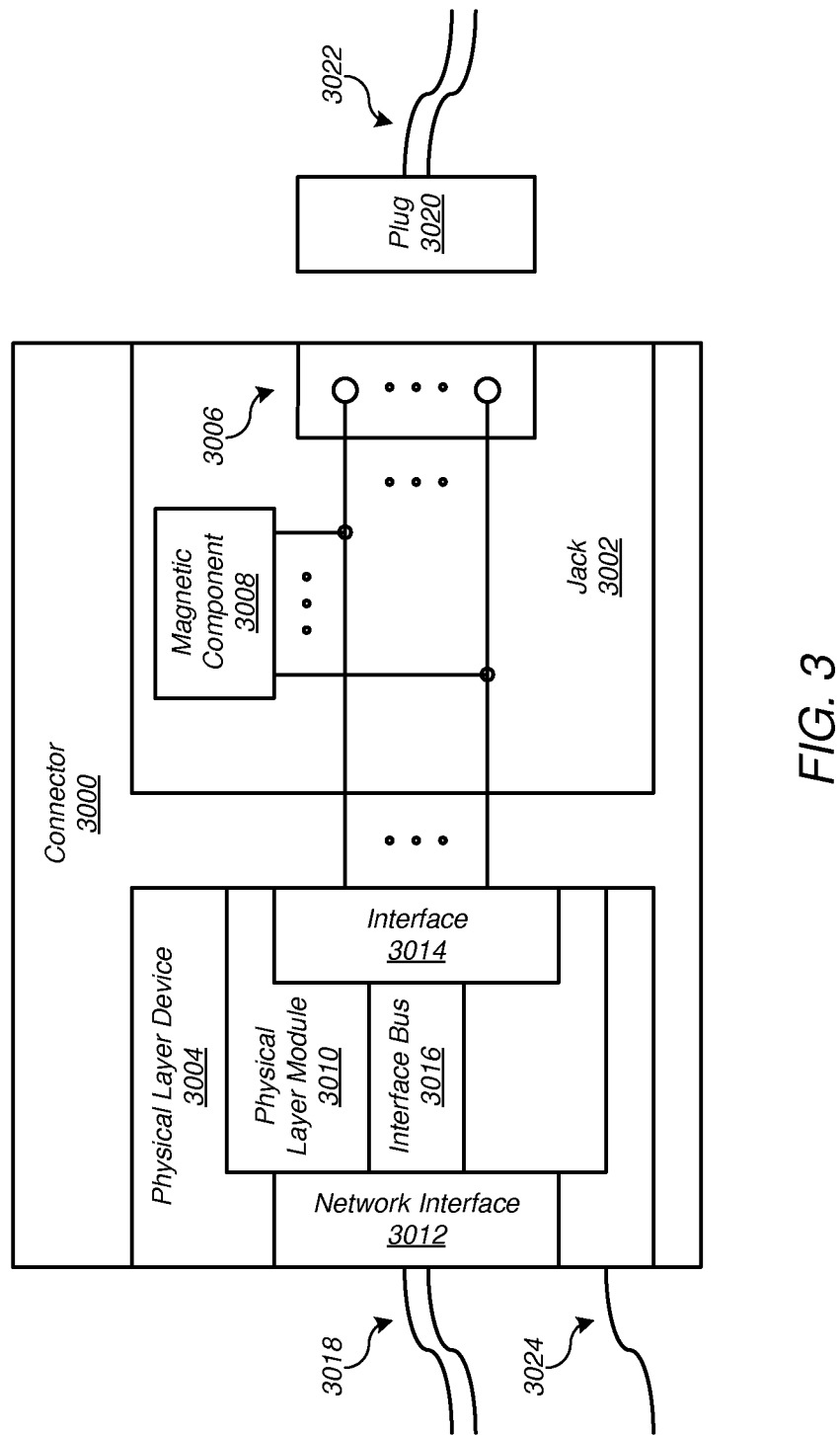
FIG. 3 shows a connector according to one embodiment.

FIG. 3 shows a connector 3000 according to one embodiment. The connector 3000 includes a jack 3002 and a physical layer (PHY) device 3004. The connector 3000 can be implemented as a single module, as one or more components disposed upon a printed circuit board, and the like. The jack 3002 can receive a plug 3020 of a network cable 3022 such as an Ethernet cable or the like. The jack 3002 includes a plurality of electrical terminals 3006 and a magnetic component 3008 electrically coupled to the electrical terminals 3006. The magnetic component 3008 includes at least one wirewound component, transformer, coil, or the like. The magnetic component 3008 can include additional components as well, such as resistors, capacitors, and the like. In some embodiments, the physical layer device 3004 is implemented as a conventional physical layer device such as a conventional Ethernet physical layer device or the like. In other embodiments, the physical layer device 3004 is implemented as an intelligent physical layer device. The remainder of this disclosure describes embodiments featuring intelligent physical layer devices. In the remainder of this disclosure, these intelligent physical layer devices are referred to simply as "physical layer devices."

Figure 4:
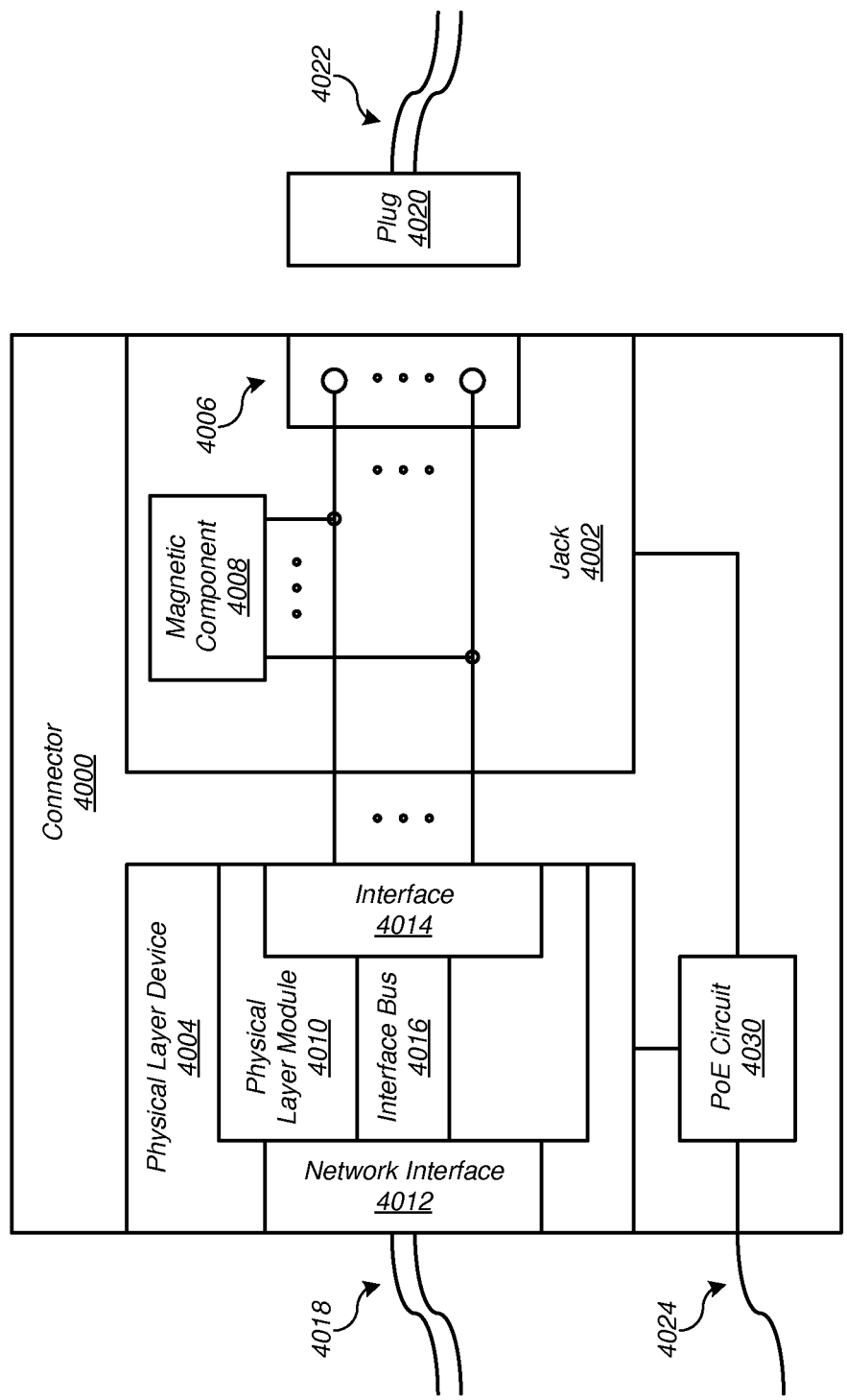
FIG. 4 shows a connector according to an embodiment that supports Power over Ethernet (PoE) technology.

The physical layer device 3004 includes a physical layer module 3010 and a network interface 3012. The physical layer device 3004 receives power over a power lead 3024. The network interface 3012 can be an electrical interface, an optical interface, or the like. For example, the network interface 3012 can be a 10G SERDES interface or the like. The physical layer module 3010 includes an interface 3014 configured to receive packets from the jack 3002. For example, the packets can be received over the Ethernet cable 3022 from a network device 2006, from the Internet 2010, and the like. The physical layer module 3010 also includes an interface bus 3016 configured to determine one or more characteristics of one or more of the packets. The network interface 3012 is configured to provide one or more of the packets, over a communications cable 3018, to a device separate from the physical layer device 3004 based on the characteristics of the packets. For example, the network interface 3012 can provide the packets to a switch such as the aggregation switch 2012 of FIG. 2. to a control module such as the central control module 2014 of FIG. 2, and the like. Embodiments of the physical layer devices are described in greater detail in the Appendix below. Some embodiments support Power over Ethernet (PoE) technology. FIG. 4 shows a connector 4000 according to one such embodiment. The connector 4000 includes a jack 4002, a physical layer (PHY) device 4004, and a PoE circuit 4030. The connector 4000 can be implemented as a single module, as one or more components disposed upon a printed circuit board, and the like. The jack 4002 can receive a plug 4020 of a network cable 4022 such as an Ethernet cable or the like. The jack 4002 includes a plurality of electrical terminals 4006 and a magnetic component 4008 electrically coupled to the electrical terminals 4006. The magnetic component 4008 includes at least one wirewound component, transformer, coil, or the like. The magnetic component 4008 can include additional components as well, such as resistors, capacitors, and the like. The jack 4002 is capable of providing power over terminals 4006 in accordance with PoE technology. Each of the physical layer device 4004 and the PoE circuit 4030 receives power over a power lead 4024. In other embodiments, the physical layer device 4004, and the PoE circuit 4030, receive power over separate power leads. The PoE circuit 4030 provides power to the jack 4002 for transmission over the terminals 4006 of the jack 4002.

The physical layer device 4004 includes a physical layer module 4010 and a network interface 4012. The physical layer device 4004 receives power over a power lead 4024. The network interface 4012 can be an electrical interface, an optical interface, or the like. The network interface 4012 can be an electrical interface, an optical interface, or the like. For example, the network interface 4012 can be a 10G SERDES interface or the like. The physical layer module 4010 includes an interface 4014 configured to receive packets from the jack 4002. For example, the packets can be received over the network cable 4022 from a network device 2006, from the Internet 2010, and the like. The physical layer module 4010 also includes an interface bus 4016 configured to determine one or more characteristics of one or more of the packets. The network interface 4012 is configured to provide one or more of the packets, over a cable 4018, to a device separate from the physical layer device 4004 based on the characteristics of the packets. For example, the network interface 4012 can provide the packets to a switch such as the aggregation switch 2012 of FIG. 2. to a control module such as the central control module 2014 of FIG. 2, and the like. Embodiments of the physical layer devices are described in greater detail in the Appendix below.

Figure 5:
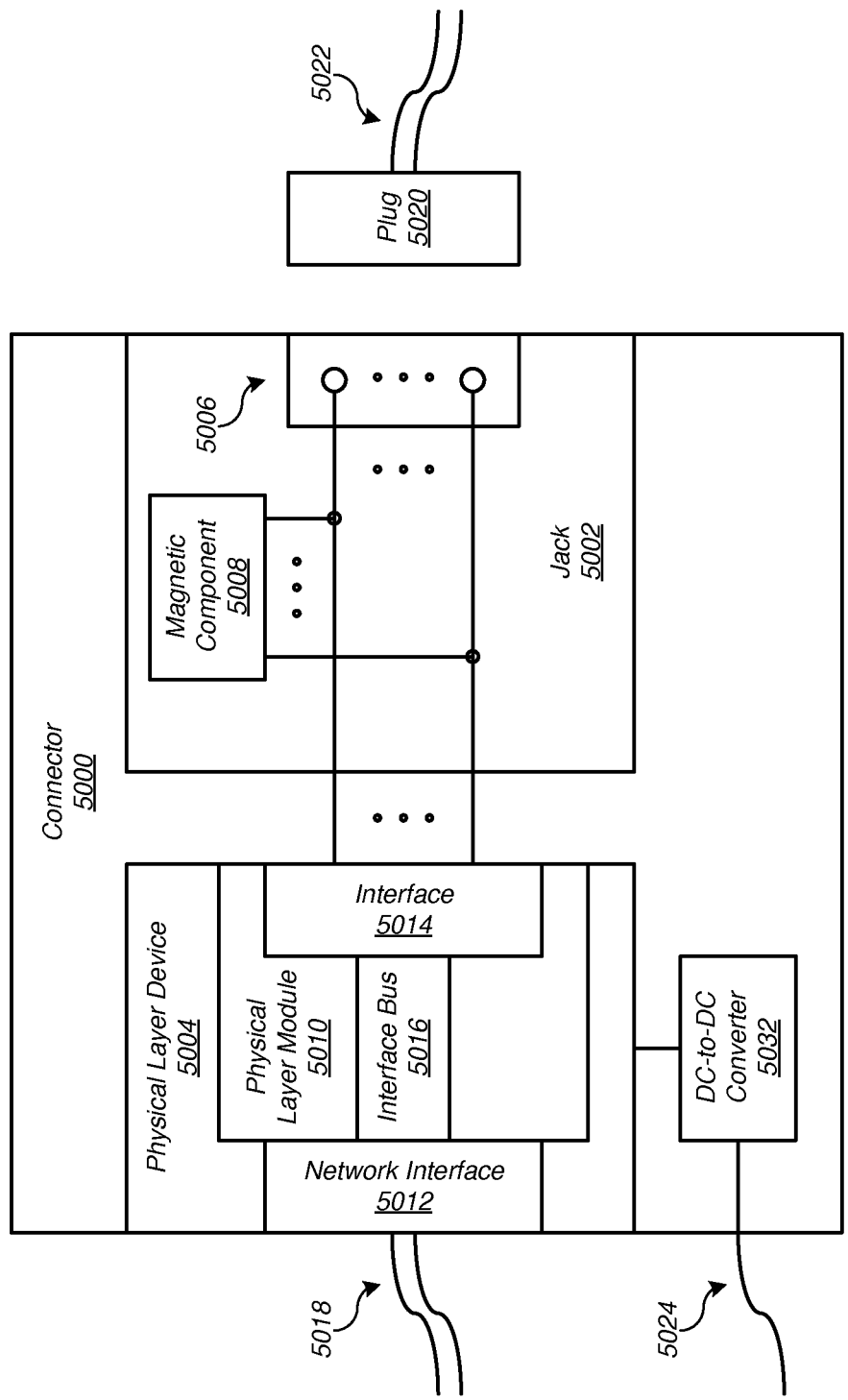
FIG. 5 shows a connector according to an embodiment that supports power conversion.

Some embodiments support power conversion. FIG. 5 shows a connector 5000 according to one such embodiment. The connector 5000 includes a jack 5002, a physical layer (PHY) device 5004, and a DC-to-DC converter 5032. In some embodiments, the connector 5000 also includes a PoE circuit such as that described above with reference to FIG. 4. The connector 5000 can be implemented as a single module, as one or more components disposed upon a printed circuit board, and the like. The jack 5002 can receive a plug 5020 of a network cable 5022 such as an Ethernet cable or the like. The jack 5002 includes a plurality of electrical terminals 5006 and a magnetic component 5008 electrically coupled to the electrical terminals 5006. The magnetic component 5008 includes at least one wirewound component, transformer, coil, or the like. The magnetic component 5008 can include additional components as well, such as resistors, capacitors, and the like. The jack 5002 is capable of providing power over terminals 5006 in accordance with PoE technology. Each of the physical layer device 5004 and the DC-to-DC converter 5032 receives power over a power lead 5024. The power lead 5024 provides a single DC voltage to the DC-to-DC converter 5032. The DC-to-DC converter 5032 generates the multiple different DC voltages required by the PHY device 5004 based on the single DC voltage, and provides these voltages to the PHY device 5004. As a result, the power lead 5024 can be simplified, and DC-to-DC converters elsewhere in the chassis can be eliminated.

The physical layer device 5004 includes a physical layer module 5010 and a network interface 5012. The physical layer device 5004 receives power over a power lead 5024. The network interface 5012 can be an electrical interface, an optical interface, or the like. The network interface 5012 can be an electrical interface, an optical interface, or the like. For example, the network interface 3012 can be a 10G SERDES interface or the like. The physical layer module 5010 includes an interface 5014 configured to receive packets from the jack 5002. For example, the packets can be received over the Ethernet cable 5022 from a network device 2006, from the Internet 2010, and the like. The physical layer module 5010 also includes an interface bus 5016 configured to determine one or more characteristics of one or more of the packets. The network interface 5012 is configured to provide one or more of the packets, over a cable 5018, to a device separate from the physical layer device 5004 based on the characteristics of the packets. For example, the network interface 5012 can provide the packets to a switch such as the aggregation switch 2012 of FIG. 2. to a control module such as the central control module 2014 of FIG. 2, and the like. Embodiments of the physical layer devices are described in greater detail in the Appendix below.

In embodiments where the aggregation switch 2012 and the connectors 2016 are implemented on a single printed circuit board, the physical layer devices 3004, 4004, 5004 receive power from the printed circuit board, and the network interfaces 3012, 4012, 5012 exchange the packets over the printed circuit board. In such embodiments, the communications cables 3018, 4018, 5018 and the power leads 3024, 4024, 5024 are not required.

Figure 1:
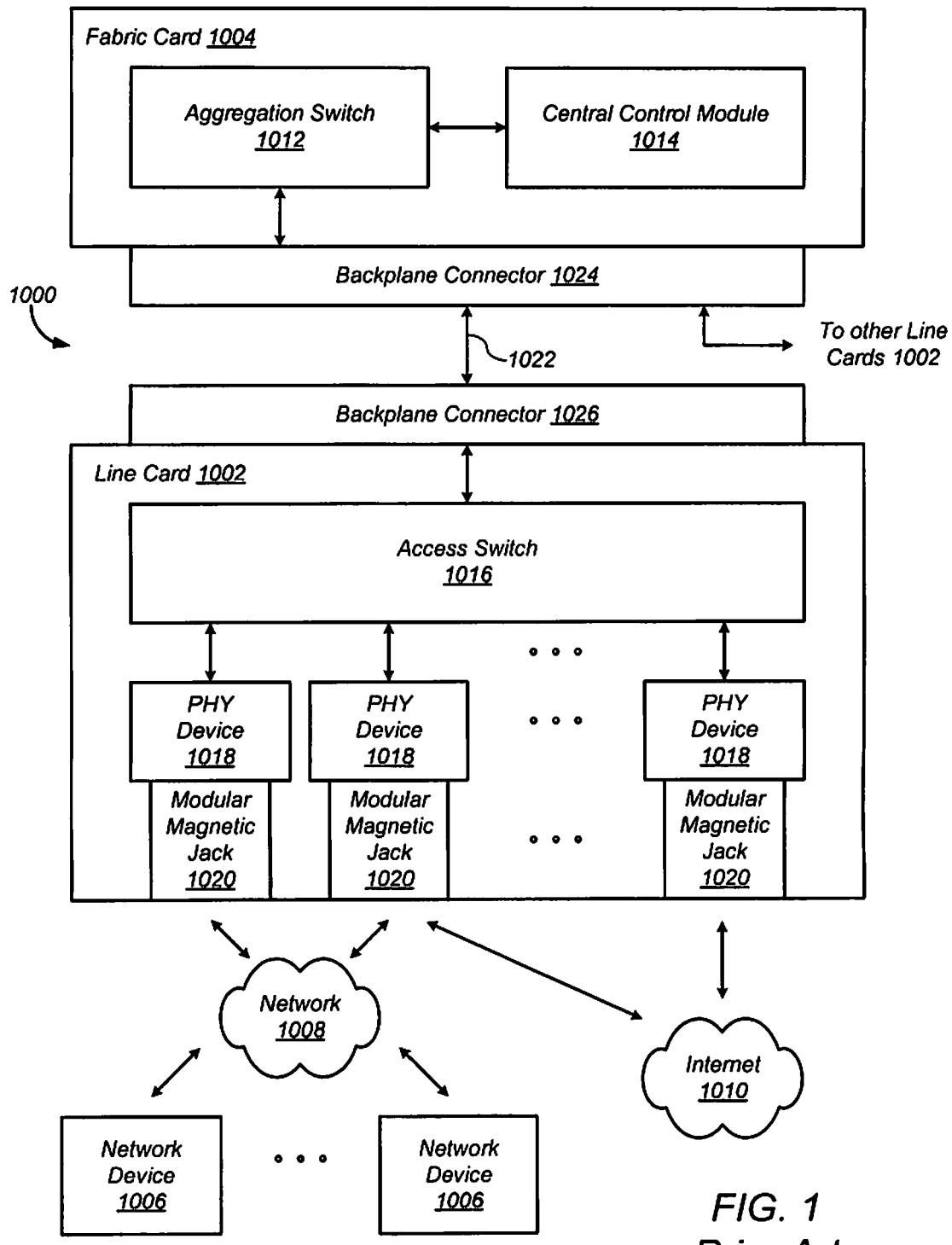
FIG. 1 shows a conventional access chassis that includes modular magnetic jacks.

Various embodiments feature one or more of the following advantages. Line cards 1002, and the access switches 1016 thereon (FIG. 1) are eliminated, with a corresponding reduction in cost and complexity. For example, software upgrades are simplified because the upgrades no longer require coordinated upgrades across multiple types of switches (that is, access switches 1016 and aggregation switches 1012). In embodiments that feature a PoE circuit 4030 in the connector 4000 (FIG. 4), network devices 2006 can receive power from the connector 4000. In embodiments that feature a DC-to-DC converter 5032 in the connector 5000 (FIG. 5), the power lead 5024 can be simplified, and DC-to-DC converters elsewhere in the chassis can be eliminated.

APPENDIX

An access network may include an access chassis with fabric cards and line cards. The fabric cards may each include an aggregation switch and a central control module. The line cards may each include an access switch and multiple PHY devices. Because each of the fabric cards includes a central control module and an aggregation switch and each of the line cards includes an access switch, a control plane associated with the access chassis is complex. The line cards may be referred to as high cost and/or high-power cards due to the inclusion and operation of the access switch. The access chassis may be upgrade limited, as each of the line cards needs to be replaced in order to perform a control specific upgrade (e.g., upgrade to change how switch connections are provided).

In the following examples, multiple access networks are provided. A first access network is disclosed in FIGS. 7-8 and includes line cards that do not include access switches. Switching between the line cards, between network devices, and between the network devices and the Internet are provided via fabric cards. As a result, the line cards may be referred to as low cost and/or low-power line cards. The line cards include PHY modules that may be configured to perform deep packet inspection (DPI). DPI includes inspection of packets to determine whether a packet is a valid packet or an invalid packet. A packet may be an invalid packet when the packet has an incorrect format, contains a pattern associated with an attack and/or virus, has improper value(s), includes spam, introduces a security threat and/or does not satisfy predefined criteria. DPI may include inspection of headers and/or a payload of one or more packets. The headers may include, for example, an internet protocol (IP) header, a transmission control protocol (TCP), a user datagram protocol (UDP), and/or other headers.

Since the line cards do not include access switches and the fabric cards control access, aggregation and switching functionality for the line cards, network devices, and the Internet, the access network chassis is easily upgradable. During an upgrade, control logic, software, and/or hardware may be altered and/or replaced. The access network may be upgraded by simply replacing one or more of the fabric cards and not the line cards. In addition, complexity of a control plane associated with the access network is reduced, since switching of the connections is performed in one or more centralized locations, as opposed to being performed in numerous line cards and fabric cards. The access network of FIGS. 7-8 and other example access networks and associated features are described below.

Figure 7:
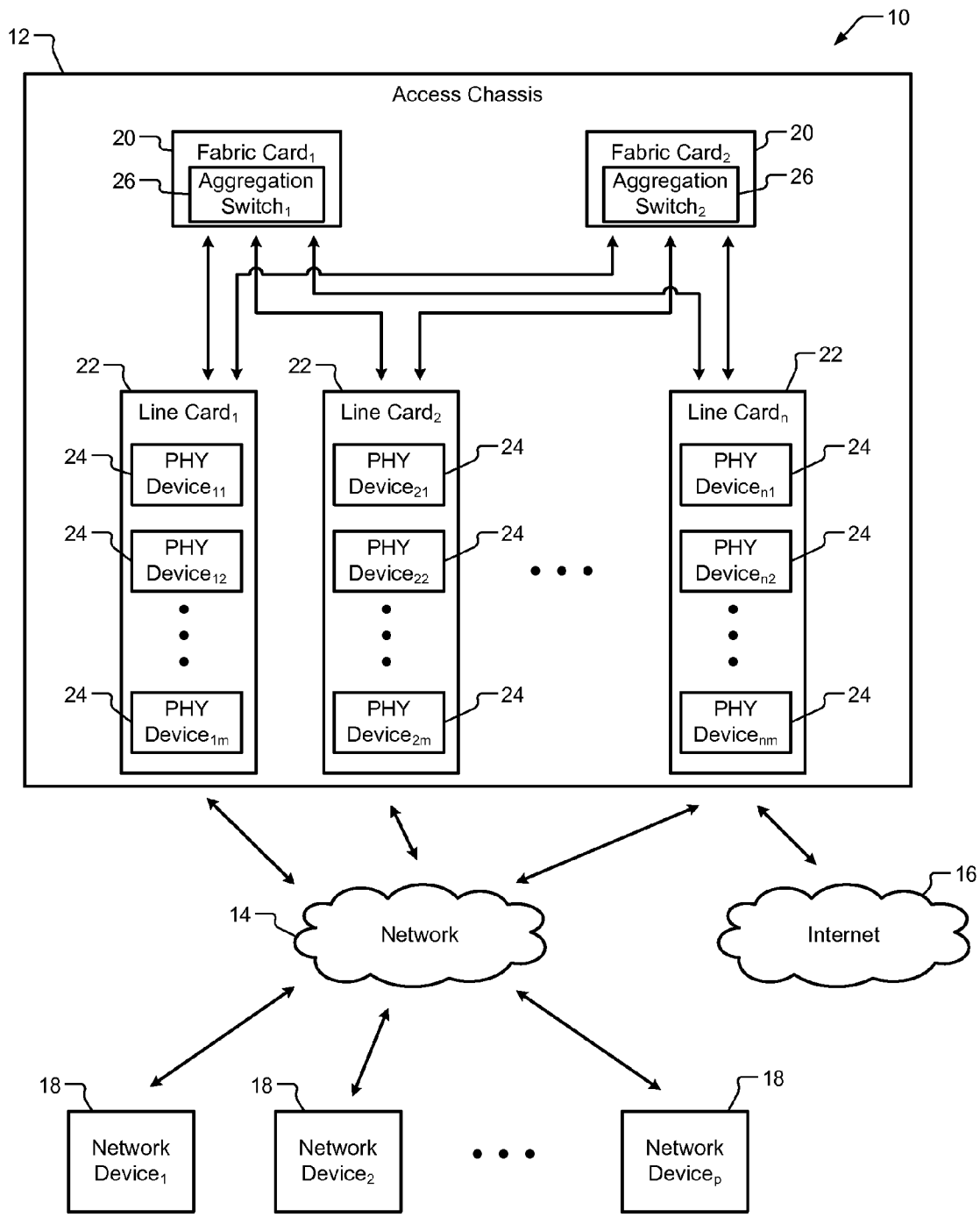
FIG. 7 is a functional block diagram of an access network incorporating an access chassis in accordance with the present disclosure.

In FIG. 7, an access network 10 is shown. As an example, the access network 10 may be an application-aware network. An application-aware network is a network that directly cooperates with applications and services to maximize network responsiveness to application-specific requirements. Modules in an application-aware network may convey objects including methods to be invoked at different points in the network. Application-specific programming of switches and processing devices is performed according to the methods. The modules perform customized computations and resource management to meet application-specific requirements. An application-aware network may be used to manage security of proprietary networks and/or local area networks (LANs).

The access network 10 may include an access chassis 12, a network 14, an Internet 16, and network devices 18 (p network device are shown). The access chassis 12 is connected to the network devices 18 via the network 14. The network 14 may be, for example, an Ethernet network. The access chassis 12 routes signals between the network devices 18 and/or between the network devices 18 and the Internet 16. The network devices 18 may include user devices, peripheral devices, and/or data storage devices. The user devices may include computers, cellular phones, set top boxes, televisions, etc.

Figure 10:
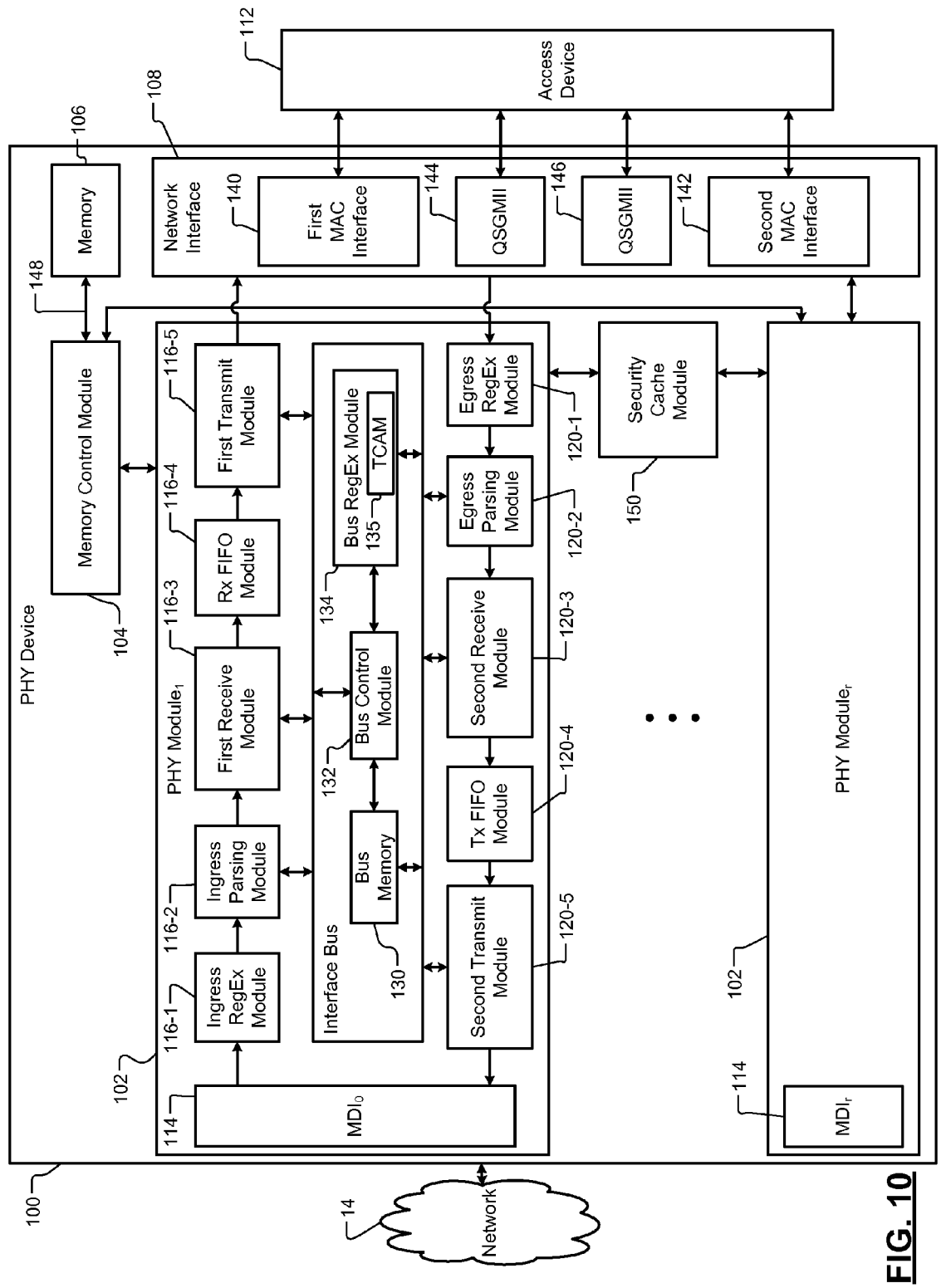
FIG. 10 is a functional block diagram of a PHY device in accordance with the present disclosure.

The access chassis 12 includes one or more fabric cards 20 (2 are shown), and one or more line cards 22 (n are shown). The line cards 22 include PHY devices 24. An example of a PHY device is shown in FIG. 10. In the example shown, each of the line cards 22 includes m PHY devices. As an example, the access chassis 12 may include 48 line cards, where each of the line cards includes one or more PHY devices (e.g., 6 PHY devices). Each of the fabric cards 20 includes an aggregation switch 26 that provides connections between the line cards 22, between the PHY devices 24 on the same line card, and/or between the PHY devices on different ones of the line cards 22.

Figure 8:
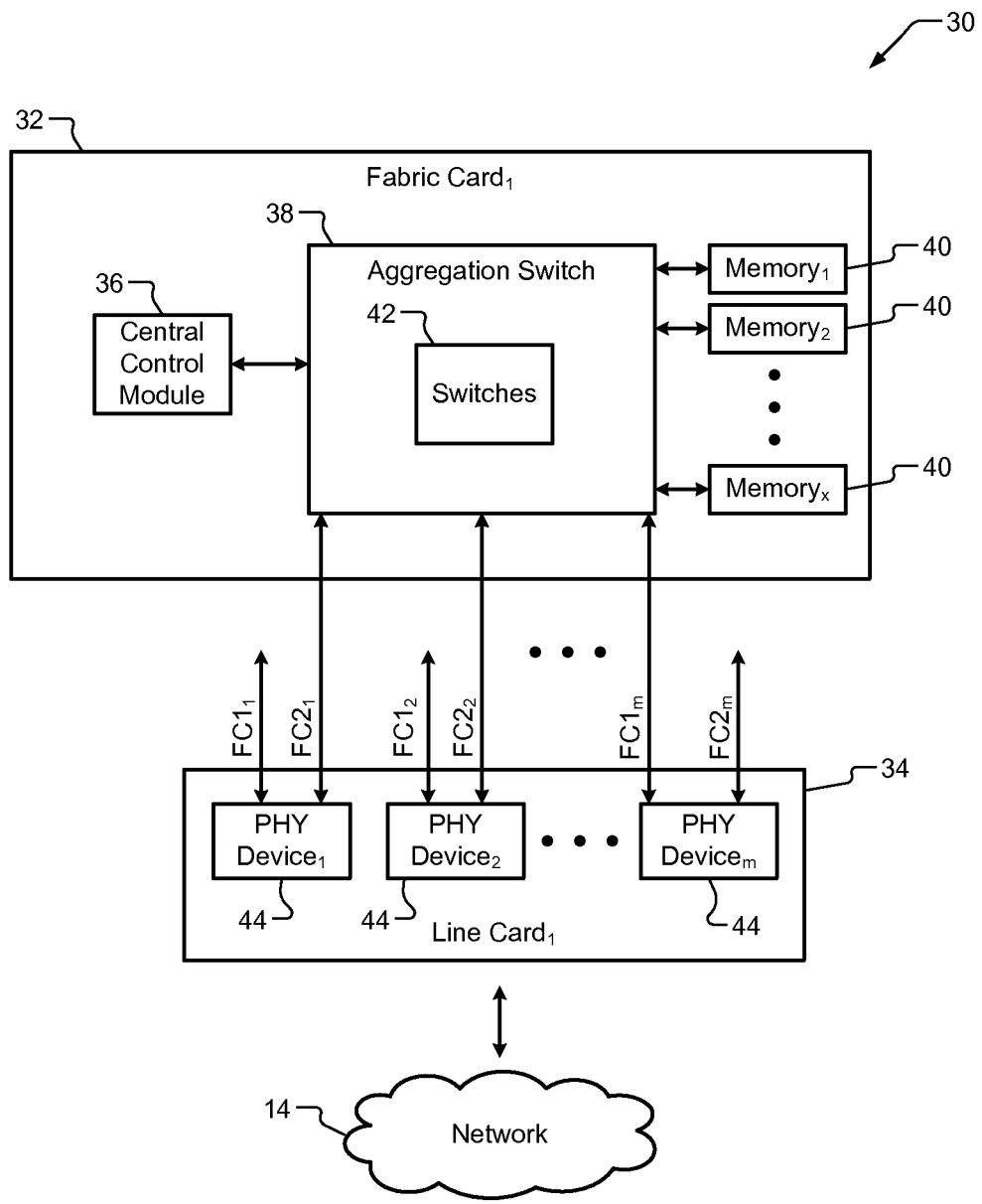
FIG. 8 is a functional block diagram of a portion of the access chassis of FIG. 7.

Referring now also to FIG. 8, a portion 30 of the access chassis 12 is shown. The portion 30 includes one of the fabric cards 20 (designated 32) and one of the line cards 22 (designated 34). Each of the fabric cards 20 may include a central control module 36, an aggregation switch (designated 38 in FIG. 8), and memory devices 40. In one implementation, the central control module 36 is not included in the aggregation switch 38. The aggregation switch 38 switches between PHY devices 24 on the line cards 22 and provides centralized switching. The central control module 36 may control states of switches 42 in the aggregation switch 38.

The memory devices 40 may each include, for example, double data rate type 3 (DDR3) synchronous random access memory (SRAM) and/or other suitable memory, such as dynamic random access memory (DRAM). Each of the line cards 22 includes respective ones of the PHY devices 24 (example PHY devices of a first line card 34 are designated 44 in FIG. 8) and does not include an access switch. An access switch refers to a switch located on a line card and configured to provide connections between the line card and a fabric card of an access chassis.

The PHY devices 44 enable centralized switching. Switching is not performed at the PHY devices 44, but rather is performed at the fabric cards 20. The PHY devices 44 forward the received packets to the fabric cards 44 to then be forwarded to expected or originally selected destinations. Each of the PHY devices 44 may perform DPI. This provides DPI at an edge of the access network 30. An edge of an access network may refer to a boundary between the access chassis 32 and the network 14 and/or at a boundary between the access chassis 32 and the network devices 18. DPI may include sending packets to the central control module 36 when a PHY module of one of the PHY devices 44 is unable to determine whether a packet is a valid packet or an invalid packet. As an example, a packet may be forwarded from the PHY module to the central control module 36 via the aggregation switch 38 for inspection. The central control module 36 may inspect the packet to determine the validity of the packet and then either instruct the PHY module to drop (i.e. delete and/or prevent further transmission of packets similar to the packet) or forward packets similar to the first packet based on results of the inspection. An invalid packet may be dropped, whereas a valid packet may be forwarded. Similar packets may refer to packets having the same format, source address, destination address, and/or other packet parameters and/or fields.

The PHY module may inspect ingress packets, forward the ingress packets towards the aggregation switch 38, tunnel the ingress packets to the central control module 36 for further inspection, and/or drop invalid or unsecure ones of the ingress packets. During packet inspection, PHY hardware of the PHY devices 44 identifies ingress packets as: valid packets; packets for which further localized inspection is to be performed; packets for which centralized inspection is to be performed; or invalid packets. Localized inspection refers to inspection performed within the PHY devices 44 and/or by modules within the PHY devices 44. Centralized inspection refers to inspection performed external to the PHY devices 44, and in, for example, the central control module 36. A valid packet may refer to a packet that is quickly (within a predetermined period) and/or clearly determined to be safe and correct (does not have one or more errors) and/or have a proper format, signature, and/or pattern. As an example, a packet received from a particular local source may be determined to be valid based on a received address of the source.

A packet for which further centralized inspection is to be performed may refer to a packet that has been inspected by the PHY hardware and/or a module of the associated PHY device, but is not quickly and/or clearly determined to be a valid packet. Such a packet may have one or more errors, unknown format, include suspicious content, or be from a remote source outside of a local network. For this reason, the packet may be further inspected by the central control module 36.

A tunneling packet refers to: a packet that is not recognizable to the PHY device and/or module of the PHY device; may have been inspected by the PHY device and/or module of the PHY device; and/or the PHY device and/or module of the PHY device is unable to determine whether the packet is a valid packet or an invalid packet. The tunneling packet may not be inspected by the PHY device and/or module of the PHY device and may be simply forwarded to the central control module 36. An invalid packet is a packet that is determined to be invalid through inspection. The invalid packet may have an improper format, signature, pattern, and/or values. If a packet is determined to be invalid by the PHY device and/or module of the PHY device, the packet may be dropped, deleted, prevented from being forwarded to a device or module in the access chassis, and/or may not be forwarded to one of the fabric cards 20. Tunneling packets and packets for which further localized inspection is to be performed may be referred to as suspicious packets.

Each of the PHY devices 24, 44 may include a communication link to each of the fabric cards 20. In FIG. 8, FC1 refers to fabric card$_1$. FC2 refers to fabric card$_2$. Subscripts of each of the communication links FC1, FC2 refer to one of the PHY devices 44. For example, FC1$_1$ refers to communication links between fabric card$_1$ and PHY device$_1$. Two communication links are provided for load balancing and/or interface redundancy. Load balancing may including transporting equal amounts of data over two or more links during the same time period. Interface redundancy may refer to the inclusion of two or more interfaces (or communication links), where one or more of the interfaces are provided as a backup in case an interface is disabled or unusable.

The memory devices 40 may be used to store instructions, code, rules, tables, and/or packet data. The instructions, code, rules, and/or tables may be used by the central control module 36, the aggregation switch 38, and/or the PHY devices 44 when performing DPI and/or when controlling states of the switches 42. The memory devices 40 may be used to store: packets that are being inspected; copies of selected packets to be inspected; and/or packets that are to be forwarded, uplinked, and/or downlinked. A packet is uplinked when the packet is forwarded from one of the network devices 18 via the access chassis 12 to the Internet 16. A packet is downlinked when the packet is forwarded from the Internet 16 via the access chassis 12 to one of the network devices 18.

Figure 9:
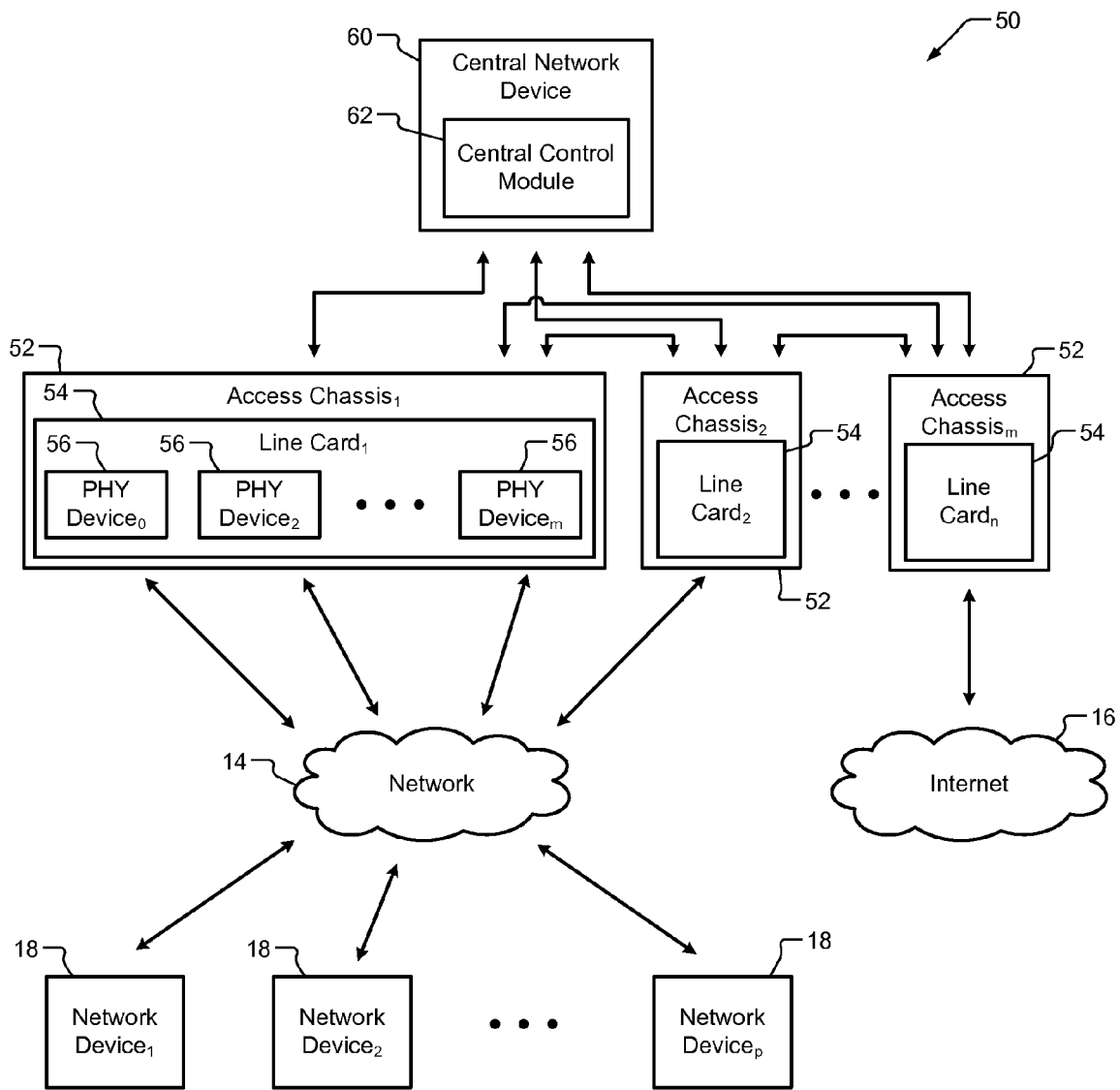
FIG. 9 is a functional block diagram of another access network incorporating PHY devices in accordance with the present disclosure.

In FIG. 9, another access network 50 is shown. As an example, the access network 50 may be an application-aware network and include one or more access chassis 52 (m are shown), the network 14, the Internet 16, and the network devices 18. The access chassis 52 may include routers, switches, computers, servers, or other suitable access devices. Each of the access chassis 52 includes a line card 54. Each of the line cards 54 includes one or more PHY devices 56. An example of a PHY device is shown in FIG. 10. Each of the PHY devices 56 includes one or more PHY modules. Example PHY modules are shown in FIG. 10. The PHY devices 56 communicate with the network devices 18 via the network 14.

The access chassis 52 may provide connections between each other, between PHY devices of the same access chassis, between PHY devices of different access chassis, and/or between the PHY devices and the Internet 16. In so doing, the access chassis 52 may provide connections between the network devices 18 and/or between the network devices 18 and the Internet 16.

The access network 50 may also include a central network device 60. The central network device 60 may be used to control the access chassis 52, to perform DPI, and/or to inspect packets that are indiscernible (referred to as tunneling packets) by the access chassis 52. A tunneling packet may be a packet that cannot be determined by an access chassis, a PHY device, and/or a module of a PHY device to be valid or invalid.

The central network device 60 may be located in a network remote from the access chassis 52 and/or may be located in a local network of the access chassis 52. The central network device 60 may be disposed within one or more of the access chassis 52. The central network device 60 and/or one or more of the access chassis 52 may be collectively a service provider providing one or more services to the network devices 18.

The PHY devices 24, 44, 56 and modules of the PHY devices 24, 44, 56 of FIGS. 7-9 may be located and/or connected, for example, between a) the network 14 or the Internet 16 and b) MAC devices and/or other higher layer devices in the line cards 22, 34 and access chassis 52. The PHY devices 24, 44, 56 may refer to devices in a physical layer of the line cards 22, 34 and access chassis 52.

Referring also to FIG. 10, a PHY device 100 is shown. The PHY device 100 may be used: to provide a security firewall between networks; for zero-day attack prevention; in access enterprise networks; etc. The PHY device 100 may be referred to as a firewall in a PHY package. The PHY device 100 may provide firewall functionality operating across multiple International Organization for Standardization (ISO) and/or open systems interconnection (OSI) layers, not only across a PHY layer. The firewall functionality is provided across PHY layers and layers (e.g., MAC layers) higher than the PHY layers. A zero-day attack is an attack that exploits a previously unknown vulnerability in a computer application. A zero-day attack occurs on "day zero" of awareness of the vulnerability. This means there have been zero days to address and patch the vulnerability. A zero-day attack exploits software that uses a security hole to carry out an attack. Zero-day attack prevention refers to prevention of a zero-day attack. This may include preventing invalid packets, such as packets associated with a virus or a worm, from spreading (i.e. being further passed along in a network). This includes dropping (or deleting) the invalid packets upon detection of the attack. This detection and dropping of the packets may be performed by the PHY device 100 and/or one of the devices and/or modules of the PHY device 100.

In an access enterprise network, the PHY device 100 and/or one or more devices and/or modules of the PHY device 100 may be used to: prevent network devices from accessing the Internet 16; and/or provide limited access to the Internet 16. Example devices and modules of the PHY device 100 are described below.

The PHY device 100 includes PHY modules 102 (may be referred to as PHY channels), a memory control module 104, a PHY memory 106, and a network interface 108 (may be referred to as a fabric interface). The PHY device 100 communicates with the network 14 via the PHY modules 102 and with, for example, an aggregation switch (e.g., the aggregation switch 38) or a central network device (e.g., the central network device 60) via the network interface 108. The aggregation switch and the central network device are shown as access device 112 in FIG. 10. The aggregation switch may provide switching to route packets between the PHY modules 102 and/or between PHY modules of different PHY devices.

Each of the PHY modules 102 may include a media dependent interface (MDI) 114 (or first network interface), ingress modules 116, an interface bus 118, and egress modules 120.

The MDIs 114 receive packets from, for example, one or more network devices via the network 14 and forwards the packets to the ingress modules 116. The MDIs 114 also receive packets from the egress modules 120 and transmits the packets to, for example, the network devices via the network 14. In one implementation, each of the MDIs 114 is connected to a twisted wire pair. In the implementation shown, the PHY device 100 includes 8 MDIs or other suitable interface(s).

The ingress modules 116, the egress modules 120 and/or other modules and/or devices of each of the PHY modules 102 other than the interface bus 118 may collectively be referred to as PHY hardware. The ingress modules 116 may include an ingress regular expression (RegEx) module 116-1, an ingress parsing module 116-2, a first receive module 116-3, a receive first-in-first-out (FIFO) module 116-4, and a first transmit module 116-5. The PHY modules 102 may not include one or more of the ingress modules 116. The ingress RegEx module 116-1, when included, performs a RegEx process to examine packets. The RegEx process includes comparing characters, words, signatures or patterns of data with predetermined characters, words, signatures and patterns of data. The RegEx process may be performed as part of a DPI process. The ingress RegEx process may be performed to quickly identify packets that are valid or invalid.

The ingress parsing module 116-2 may discard invalid packets and may forward valid packets and/or headers of the valid packets to the interface bus 118 and the first receive module 116-3. The first receive module 116-3 may be a direct memory access (DMA) device and copy and/or store packets, portions of the packets, packet descriptors and/or packet information received from the ingress parsing module 116-2 and/or the interface bus 118 in the PHY memory 106 and/or in a bus memory 130 of the interface bus 118. A bus control module 132 of the interface bus 118 may control storage of data in the bus memory 130. Storage in the PHY memory 106 may be performed via the memory control module 104. The portions of the packets may include one or more headers, and/or payloads of the packets. The packet information may include information included within the headers and/or other information, such as an inspection level of the packet, a source address, a destination address, a source ID, a destination ID, a protocol ID, a length of the packet, etc. The inspection level may indicate whether the packet is: a valid packet; a packet for which additional inspection is to be performed by the bus control module 132 and/or a bus regular expression module 134; a packet to be tunneled to a central control module (e.g., the central control module 62); or an invalid packet that is to be dropped.

The ingress parsing module 116-2 may also indicate to the interface bus 118 and/or the bus control module 132 whether a packet should be inspected by the interface bus 118 and/or the bus control module 132. The first receive module 116-3 may, based on instructions from the interface bus 118, a) store packets in and/or copy packets to the PHY memory 106 and/or b) forward packets to the receive FIFO module 116-4.

The receive FIFO module 116-4, when included, stores packets to be forwarded to the network interface 108 (or second network interface). The packets, packet descriptors, and/or packet information stored in the bus memory 130 and/or the PHY memory 106 may be stored in the receive FIFO module 116-4 for inspection by the bus control module 132 and/or a bus RegEx module 134 of the interface bus 118. The bus control module 132 and/or the bus RegEx module 134 may be individually or collectively referred to as a local control module and may perform localized inspection of packets.

The first transmit module 116-5 may also be a DMA device and may transmit packets received from the receive FIFO module 116-4, the PHY memory 106, and/or the interface bus 118 to the network interface 108. The first transmit module 116-5 may, based on instructions received from the interface bus 118 and/or modules of the interface bus 118, a) access packets stored in the PHY memory 106 and/or b) forward packets to the network interface 108. The first transmit module 116-5 may indicate to the network interface 108, the access device 112 whether a packet should be inspected by the aggregation switch and/or the central control module.

The interface bus 118 may be an advanced extensible interface (AXI) and/or have an advanced microcontroller bus architecture (AMBA) and use an AMBA protocol. The interface bus 118 may include the bus memory 130, the bus control module 132, and the bus RegEx module 134. The bus memory 130 may include, for example, SRAM or other suitable memory. The bus memory 130 may be used by the access device 112 and/or the PHY device 100 when performing DPI and/or when controlling states of switches in the aggregation switch, a central network device (e.g., the central network device 60), and/or in an access device (e.g., the access device 112).

The bus control module 132 and/or the bus RegEx module 134 may perform DPI to determine a security level of packets received, drop invalid packets, forward valid packets, and/or tunnel packets to the central control module for further inspection. The bus control module 132 may control RegEx parsing performed by the bus RegEx module 134. The bus control module 132 may use the bus memory 130, the memory control module 104 and/or the PHY memory 106 when performing zero day attack prevention. As each of the PHY modules 102 may include a bus control module and/or one or more RegEx module(s), a bus control module and a RegEx module may be provided for each of the MDIs 114. This provides interface or port specific packet inspection and RegEx parsing.

The bus control module 132 may perform content signature recognition tasks for application-based networking and network security applications. The bus control module 132 may inspect packets at wire-speed (e.g., 1 Gbps). The bus control module 132 may analyze a packet and determine whether to drop, forward and/or mark a packet as indiscernible at a wire-speed. The bus control module 132 may be a 32-bit processor. Each bus control module in each of the PHY modules 102 may communicate with the access device 112. This communication may include: receiving rule and/or table updates for packet inspection from the central control module; and rerouting and/or reporting unusual and/or suspicious packets from the PHY modules 102 to the central control module.

The egress modules 120 may include an egress RegEx module 120-1, an egress parsing module 120-2, a second receive module 120-3, a transmit FIFO module 120-4, and a second transmit module 120-5. The PHY modules 102 may not include one or more of the egress modules 120. The egress RegEx module 120-1, when included, performs a RegEx process to examine packets received from one of the PHY modules 102 via the network interface 108. The RegEx process includes comparing characters, words, signatures, or patterns of data with predetermined characters, words, signatures and patterns of data. The RegEx process may be performed as part of a DPI process. The egress RegEx process may be performed to quickly identify packets that are valid or invalid.

The RegEx modules 116-1, 130-1, 134 may perform packet filtering based on RegEx matching. The RegEx modules 116-1, 130-1, 134 may analyze one or more packets to detect patterns in headers and/or payloads in each packet and/or across multiple packets. RegEx searching may be performed to detect patterns over sequential packets and/or over non-sequential packets to provide a full perimeter firewall. This may include complete packet Internet protocol (IP) blocking to block packets destined to predetermined destinations and/or computers. The RegEx modules 116-1, 130-1, 134 may stop or temporarily suppress an attack until a systematic corrective action can be deployed. This allows false positives of an attack and prevents missing negatives (or errors indicating an attack). The RegEx modules 116-1, 130-1, 134 may each include, be replaced with, or be used in combination with one or more ternary content addressable memories (TCAMs). In FIG. 10, a single TCAM 135 is shown.

A content addressable memory (CAM) is an application specific memory that allows its entire contents to be searched within a single clock cycle. A binary CAM performs exact-match searches, while a TCAM allows pattern matching with the use of "don't cares". Don't cares are used as wildcards during a search, and are useful in implementing longest-prefix-match searches in routing tables. The above-mentioned TCAMs may be used for packet classification and for hardware matching acceleration. TCAMs may be used to store deterministic finite automata (DFA) representations of regular expressions used during RegEx packet inspection. A DFA is a 5-tuple (e.g., $Q, \Sigma, \delta, q_0, A$), where Q is a set of states, $\Sigma$ is an alphabet, $\delta$ is a transition function that is based on Q and $\Sigma$, $q_0$ is a start state, and A is a set of accepting states.

The egress parsing module 120-2 may discard invalid packets and may forward valid packets and/or headers of the valid packets to the interface bus 118 and the second receive module 120-3. The second receive module 120-3 may be a DMA device and copy and/or store packets, portions of the packets, packet descriptors, and/or packet information received from the egress parsing module 120-2 and/or the interface bus 118 in the bus memory 130 and/or the PHY memory 106. Storage in the bus memory 130 may be performed via the bus control module 132. Storage in the PHY memory 106 may be performed via the memory control module 104. The portions of the packets may include one or more headers, and/or payloads of the packets. The packet information may include information included within the headers and/or other information, such as an inspection level of the packet, a source address, a destination address, a source ID, a destination ID, a protocol ID, a length of the packet, etc.

The egress parsing module 120-2 may also indicate to the interface bus 118 and/or the bus control module 132 whether a packet should be inspected by the interface bus 118 and/or the bus control module 132. The second receive module 120-3 may store packets in and/or copy packets to the PHY memory 106 and/or forward packets to the transmit FIFO module 120-4 based on instructions from the interface bus 118.

The transmit FIFO module 120-4 stores packets to be forwarded to the second transmit module 120-5. The packets, packet descriptors, and/or packet information stored in the bus memory 130 and/or the PHY memory 106 may be stored in the transmit FIFO module 120-4 for inspection by the bus control module 132 and/or the bus RegEx module 134. The second transmit module 120-5 may also be a DMA device and may transmit packets received from the transmit FIFO module 120-4, the PHY memory 106, and/or the interface bus 118 to a respective one of the MDIs 114. The second transmit module 120-5 may access packets stored in the PHY memory 106 and/or forward packets to a respective one of the MDIs 114 based on instructions received from the interface bus 118, the bus control module 132 and/or the bus RegEx module 134.

The memory control module 104 may perform as an arbiter to control access between the PI-IY modules 102 and the PHY memory 106. The memory control module 104 may permit one or more of the PHY modules 102 to have access to the PHY memory 106 and prevent one or more of the PHY modules 102 from having access to the PHY memory 106. The memory control module 104 determines access times for each of the PHY modules 102 and permits access to the PHY memory 106 accordingly. The memory control module 104 may permit a first one of the PHY modules 102 to have access to the PHY memory 106 while a second one of the PHY modules 102 has access to the PHY memory 106. Alternatively, the memory control module 104 may prevent the first one of the PHY modules 102 from having access to the PHY memory 106 while the second one of the PHY modules 102 has access to the PHY memory 106.

The PHY memory 106 may include, for example, DDR3 SRAM and/or or other suitable memory, such as DRAM. The PHY memory 106 may have, for example, a 32 bit memory interface for transferring in parallel 32 bits of data. The PHY memory 106 may be external to the PHY device 100 and/or integrally formed on or as part of the PHY device 100. In one implementation, the PHY device 100 is an integrated circuit (IC) or system-in-a-package (SIP) and the PHY memory 106 is an IC separate from the PHY device 100. The PHY device 100 communicates with the PHY memory 106 via the memory control module 104 and/or a corresponding memory interface 148. The memory interface 148 may be connected between the memory control module 104 and the PHY memory 106.

In another implementation, the PHY device 100 is a first IC, the PHY memory 106 is a second IC, and the first IC and the second IC are formed as part of a SIP. In yet another implementation, the PHY device 100 is a first SIP, the PHY memory 106 is a second SIP, and the first SIP and the second SIP are integrally packaged using a package-on-package (POP) process. The second SIP may be stacked on the first SIP with a memory interface (e.g., the memory interface 148) between the SIPs to route signals between the first and second SIPs. The first SIP and the second SIP may be, for example, memory ball grid array (BGA) packages.

The PHY memory 106 may be used to buffer packets in case of congestion in one or more of the ingress modules 116 or egress modules 120. The PHY memory 106 may be used to store instructions, code, rules, tables, and/or packet data. The instructions, code, rules, and/or tables may be used by the central control module, the aggregation switch, and/or the modules 116-1, 120-1, 132, 134 when performing DPI and/or when controlling states of switches (e.g., switches in the fabric control module and/or the network interface 108). In one implementation, the instructions, code, rules, and/or tables are stored in the PHY memory 106 when, for example, there is not available space in the bus memory 130. In another implementation, the instructions, code, rules, and/or tables are stored in the bus memory 130 when, for example, there is not available space in the PHY memory 106.

The bus memory 130 and the PHY memory 106 may be used to store: packets that are being inspected; copies of selected packets to be inspected; and/or packets that are to be forwarded, uplinked, and/or downlinked. The bus memory 130 and the PHY memory 106 may be used for packet buffering in case of temporary congestion at points in an access network (e.g., one of the access networks 10, 50). The bus memory 130 may be specific to a particular PHY module (e.g., the PHY module $PHY_1$), whereas the PHY memory 106 may be shared with each of the PHY modules 102. This minimizes the number of PHY memories used for a single PHY device 100.

In the example shown, the network interface 108 includes a first media access control (MAC) interface 140, a second MAC interface 142, a first quad-serial gigabit media independent interface (QSGMII) 144, and a second QSGMII 146. The MAC interfaces 140, 142 may be 10-gigabit Ethernet interfaces. The first and second MAC interfaces 140, 142 may each perform functions of a MAC and provide communication links to, for example, a fabric card via the access device 112. The first and second MAC interfaces 140 may have, for example, 10GE-KR interfaces for connecting the access device 112 over a back plane to enable low cost DPI via a modular access chassis (e.g., the access chassis 12 of FIG. 7). The first and second QSGMIIs 144, 146 may provide two parallel communication links to the access device 112.

During operation and as an example, each of the MDIs 114 may receive or transmit 1 gigabit of data per second (Gbps) while each of the interfaces 140, 142, 144, 146 may receive or transmit 10 Gbps. The MDIs 114 may be 1 Gbps Ethernet (GE) ports and the interfaces 140, 142, 144, 146 may have 10 GE ports. The PHY device 100 via the MDIs 114 and the network interface 108 may as a result provide dynamic binding of 1GE ports to 10GE interfaces 140, 142, 144, 146. This may include load balancing, interface redundancy, time division multiplexing scheduling for interleaved packets for an uplink, buffering of data in the PHY memory, and buffering data to the PHY memory to overcome or handle bursts of data. The load balancing may include transporting equal amounts of data over two or more interfaces during the same time period. The interface redundancy may refer to the inclusion of two or more interfaces, where one or more of the interfaces are provided as a backup.

The PHY device 100, the PHY modules 102, and/or the first and second MAC interfaces 140, 142 may perform Institute of Electrical and Electronics Engineers (IEEE) 1588-2008 standard address network-based timing and synchronization. This may include the use of a precision time protocol (PIP) for synchronizing a clock of bus control modules (e.g., the bus control module 132) with a control module (e.g., the central control module 62) external to the PHY device 100. The PHY device 100, the PHY modules 102, and/or the first and second MAC interfaces 140, 142 may also provide MAC security (MACSec) support satisfying the IEEE 802.1 AE-2006 security standard, which defines connectionless data confidentiality and integrity for media access independent protocols.

The PHY device 100 may also include a security cache module (SCM) 150. Packets and/or packet information may be transmitted between the parsing modules 116-2, 120-2 and/or the interface bus 118 and the security cache module 150. The security cache module 150 may store characters, data patterns, source addresses, destination addresses and/or other packet information to indicate a type of packet. The parsing modules 116-2, 120-2, of each of the PHY modules 102 may determine whether a packet is valid or invalid based on this packet information.

Referring now to FIGS. 7-10, the PHY devices 24, 44, 56, 100 and/or PHY modules 102 may perform as distributed sensors for detecting attacks along enforcement points on the perimeter of an access network. The central control modules 36, 62, when included, may collect information, such as packet information and attack information, from the distributed sensors. The attack information may include attack patterns, signatures, and/or other attack information disclosed herein. The central control modules 36, 62 may then apply rules and/or analyze the collected information to determine whether there is an attack and/or whether packets are valid and/or invalid. The type of the packets may be determined and the packets may be forwarded based on the result of this analysis. The results of this analysis may be provided from the central control modules 36, 62 to the distributed sensors for packet forward determining purposes. The central control modules 36, 62 may instruct the distributed sensors of the packet types and how to handle packets of these types. This information may be collected, for example, in the PHY memory 106, in the bus memory 130, and/or in the security cache module 150 for future use.

Figure 11:
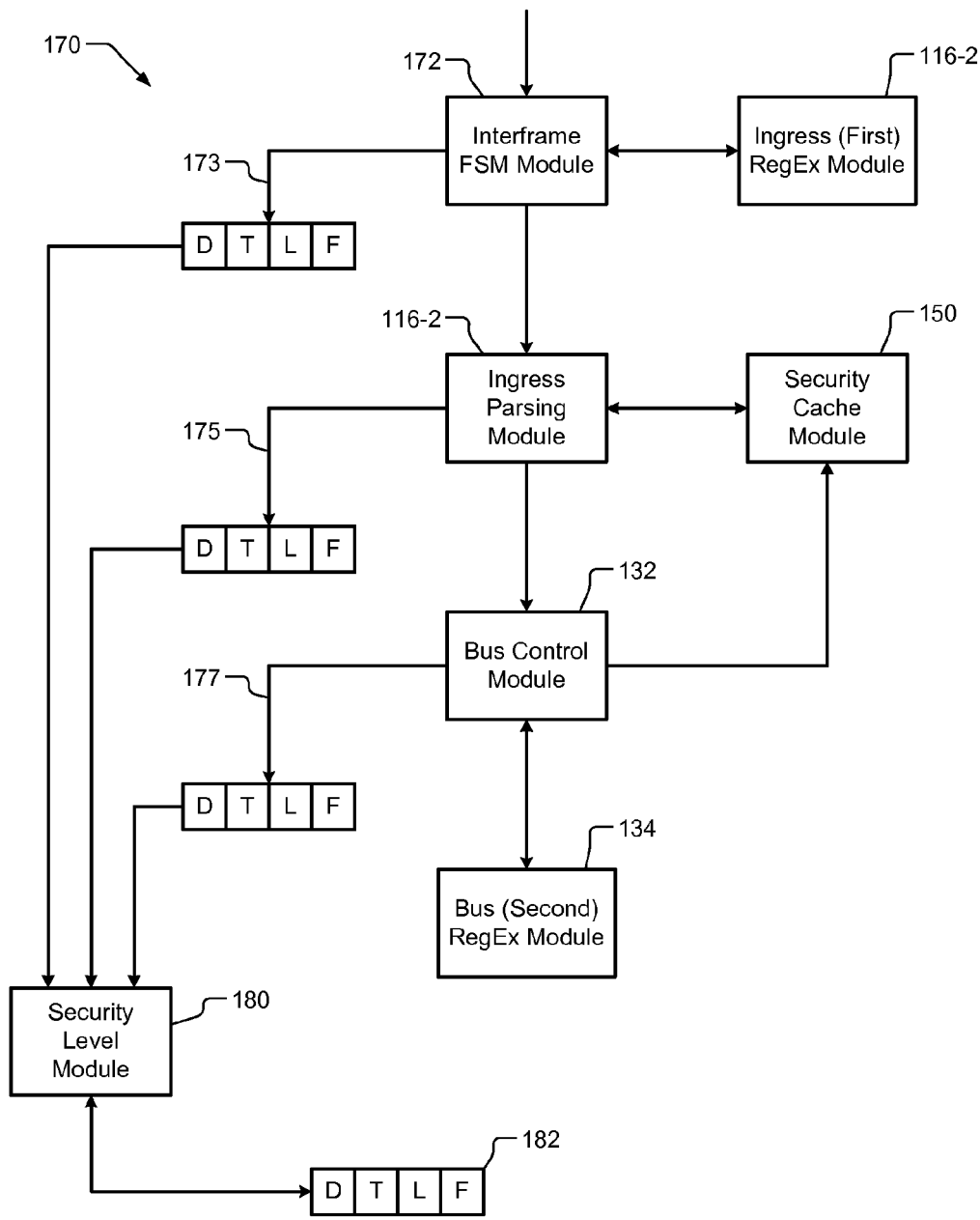
FIG. 11 is a functional block diagram of an ingress portion of a PHY module providing multi-level security detection in accordance with the present disclosure.

Referring now also to FIG. 11, an ingress portion 170 of a PHY module (e.g., one of the PHY modules 102) providing multi-level security detection is shown. The ingress portion 170 includes an interframe finite state machine (FSM) module 172, which may be included in or separate from, for example, an ingress RegEx module (e.g., the ingress RegEx module 116-1). The ingress portion 170 may include the ingress (first) RegEx module 116-1, the ingress parsing module 116-2, the bus control module 132, the security cache module 150, and the bus (second) RegEx module 134.

The interframe FSM module 172 and the ingress RegEx module 116-1 provide a first level of security. The interframe FSM module 172 uses the ingress RegEx module 116-1 for pattern and signature lookup. The first level of security includes detecting zero-day RegEx attack patterns and signatures at a line rate (e.g., 1 Gbps in packets received by the interframe FSM module 172. The packets may be received from a MDI (e.g., $MDI_0$). The ingress RegEx module 116-1 is configured to monitor for predetermined patterns and signatures to detect packets prior to patches being installed in one of the central control modules 36, 62. The ingress RegEx module 116-1 may be programmable to allow a user to add or change signatures and patterns being monitored.

The ingress RegEx module 116-1 may perform RegEx parsing with anchors and wildcards. An anchor refers to an atomic zero-width assertion that causes a match to succeed or fail depending on a current position in a string of characters of a packet. An anchor does not cause the ingress RegEx module 116-1 to advance through the string or consume characters. A wildcard refers to a character that matches zero or more characters, which is used to efficiently detect a pattern or a signature.

The ingress RegEx module 116-1 may search headers and/or payloads of packets and sequential and/or non-sequential packets. The interframe FSM module 172 generates a first command signal 173 based on the comparisons and/or matches determined by the Ingress RegEx module 116-1.

The ingress parsing module 116-2 and the security cache module 150 provide a second level of security. The ingress parsing module 116-2 and/or the bus control module 132 may push off-loaded and validated data packets and/or indiscernible packets to the SCM 150. The ingress parsing module 116-2 and/or the security cache module 150 may then compare patterns of these packets to upcoming packets. As an example, the ingress parsing module 116-2 may not analyze a received packet having a pattern of an indiscernible packet type stored in the SCM 150. The ingress parsing module 116-2 may instead directly transfer the packet to a central control module for evaluation. This reduces RegEx processing time of the ingress parsing module 116-2.

The ingress parsing module 116-2 may perform packet parsing for off-loaded flows of data at a wire-speed (e.g., 1 Gbps). The ingress parsing module 116-2 (referred to as a hardware parser) may extract 5-tuple values from packets and scan the SCM 150 for matches. Values stored in the SCM 150 may be compared to the 5-tuple values. The 5-tuple values may be used to make up a transmission control protocol (TCP) or an Internet protocol (IP) and may include, for example, a source IP address, a destination IP address, a source port number, a destination port number, and a protocol ID. The SCM 150 may have interface specific entries for each of the interfaces 114. For example, a trusted interface may have permissions for the SCM 150 that are different than an untrusted interface. The comparisons performed by the ingress parsing module 116-2 may include a comparison of an identity of the interface associated with a received packet in determining whether certain values and/or 5-tuple values stored in the SCM 150 can be accessed in association with the interface. The ingress parsing module 116-2 generates a second command signal 175 based on the comparisons performed and the instructions stored in the SCM 150.

The bus control module 132 and/or the bus RegEx module 134 provide a third level of security. The bus control module 132 may inspect received data flows and either (i) forward the data flows, and/or (ii) tunnel and/or copy validated and/or unknown data flows (flows of indiscernible packets) to the central control module. As a result of packet inspection, the bus control module 132 may store additional patterns of previously unknown flows in the SCM 150 in order to instruct the ingress parsing module 116-2 regarding actions to be taken upon receiving additional packets having the same patterns. The central control module may also or alternatively provide instructions to be stored in the SCM 150.

The bus memory 130 and/or the PHY memory 106 may store a hash table, which may be updated based on the provided instructions and recently learned data flows. The instructions may indicate actions (e.g., drop or forward) to be performed when the bus control module 132 detects a packet with a certain pattern. The RegEx modules 116-1, 120-1, 134 and the SCM 150 may be programmable to allow a user to add or change patterns, signatures and/or instructions stored. The instructions may be directed to determining a security level of the packets evaluated. The bus control module 132 may use the bus RegEx module 134 to detect patterns in received packets and then accordingly generate a third command signal 177. The bus control module 132 may continue to track non-validated flows of packets (flows of indiscernible packets) to detect an attack.

Although the multi-level security detection of FIG. 11 is shown for an ingress portion of a PHY module, the multi-level security detection may also be provided for an egress portion of the PHY module. As an example, the egress RegEx module 120-1 and the egress parsing module 120-2 may perform first and second levels of security as performed by the interframe FSM module 172, the ingress RegEx module 116-1, and the ingress parsing module 116-2. The bus control module 132 and the bus RegEx module 134 may provide the third level of security for egress purposes, as described above.

The command signals 173, 175, 177 for each of the security levels of the ingress portion are shown as drop-tunnel-local control module inspection-forward (DTLF) signals. The command signals are provided to a security level module 180. The security level module 180 determines a security level and generates a security level signal 182 based on the three command signals 173, 175, 177.

In the example, the security level module 180 includes an OR gate. Each of the command signals indicate a security level of the packet received as determined by a respective one of the security levels. The command signals may each indicate one of a first level and a second level. The first level indicates an invalid packet. The second level indicates a valid packet. Each of the security levels may provide a command signal for each packet or for a series or selected group of packets.

As a first example, the command signals may be set to 1 when indicating that the packet is invalid or should be dropped. The command signals may be set to 0 when indicating that the packet is valid or should be forwarded. As a result, if any of the command signals indicate that the packet should be dropped, the packet is dropped. This is provided by an output of the security level module 180 or the OR gate.

As another example, four security levels may be used. The first level indicates an invalid or drop packet. The second level indicates a tunneling packet. The third level indicates a packet to be locally inspected by, for example, the bus control module 132 of the bus RegEx module 134. The fourth level indicates a valid or forwarding packet. In this implementation, the security level module 180 determines the lowest level indicated by the three command signals. The lowest level indicated may then be reported by the security level module 180 and used by, for example, the first transmit module 116-5 of FIG. 10 to determine whether to instruct the central control module to further inspect the packet. In one implementation, the lowest level may be reported when the lowest level is the second level or the third level and may not be reported when the lowest level is the first level or the fourth level. In another implementation, the lowest level is reported independent of the lowest level determined of the security level module 180.

Referring again to FIGS. 7-9, as one or more modules and/or devices of the PHY devices 24, 44, 56, 100 and/or PHY modules 102 may be programmable, a customized security platform may be provided that includes DPI at the edges of the access networks 10, 50.

Figure 12:
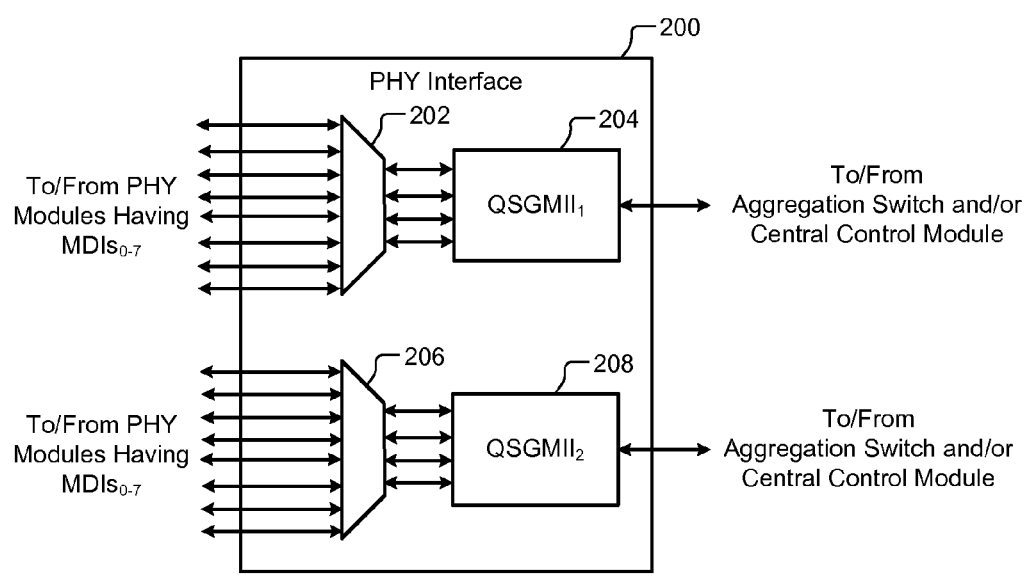
FIG. 12 is a functional block diagram of a network interface in accordance with the present disclosure.

In FIG. 12, a network interface 200 is shown. The network interface 200 may be used in the network interface 108 and/or in one of the PHY devices 24, 44, 56, 100 of FIGS. 7-9. The network interface 200 includes a first multiplexing module 202, a first QSGMII 204, a second multiplexing module 206, and a second QSGMII 208. The first and second multiplexing modules 202, 206 perform multiplexing and demultiplexing.

The first multiplexing module 202 may multiplex signals (e.g., 8 PHY module output signals) from a first set of PHY modules to multiplexed signals (e.g., 4 multiplexed signals) received by the first QSGMII 204. The second multiplexing module 206 may multiplex signals (e.g., 8 PHY device output signals) from a second set of PHY modules to multiplexed signals (e.g., 4 multiplexed signals) received by the second QSGMII 208. The first set of PHY modules may be the same or different than the second set of PHY modules. The first multiplexing module 202 may demultiplex output signals from the first QSGMII 204 to generate input signals received by the first set of PHY modules. The second multiplexing module 206 may demultiplex output signals from the second QSGMII 208 to generate input signals received by the second set of PHY modules. Outputs of the first and second QSGMII 204, 208 may be in communication with an aggregation switch and/or a central control module.

The network interface 200 allows ports of the PHY modules operating at a first speed to be connected to either the first QSGMII 204 or the second QSGMII 208, where each of the first QSGMII 204 and the second QSGMII 208 operate at a different speed than the MDIs. As an example, the first speed may be 1 Gbps and the second speed may be 10 Gbps. The multiplexing and demultiplexing performed by the multiplexing modules 202, 206 can eliminate a need for buffering of data signals at a network interface.

Figure 13:
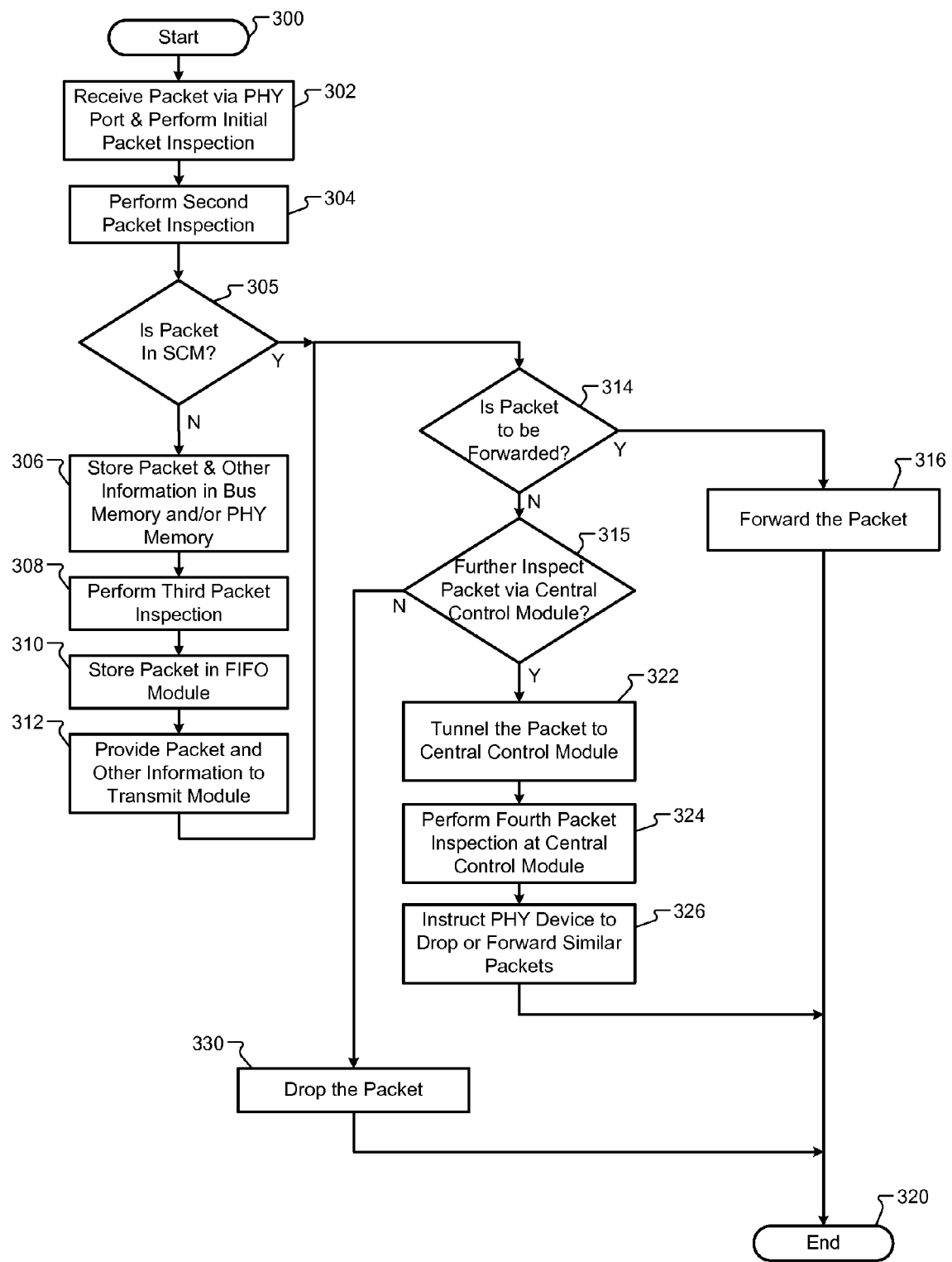
FIG. 13 illustrates a network access method including a security detection method in accordance with the present disclosure.

The access networks 10, 50 and the PHY devices 24, 44, 56, 100 described above may be operated using numerous methods, an example method is provided by the method of FIG. 13. In FIG. 13, a network access method including a security detection method is shown. Although the following tasks are primarily described with respect to the implementations of FIGS. 7-11, the tasks may be easily modified to apply to other implementations of the present disclosure. The tasks may be iteratively performed and/or performed in a different order. The method may begin at 300. Although the following tasks 302-322 are ingress tasks, the tasks may be performed similarly in reverse when performing egress tasks, such as the egress tasks performed by the egress modules 120. Also, although the following tasks are described with respect to a single packet, the tasks may be performed for multiple packets and/or a selected group of packets. The packets may be a sequential series of packets or non-sequential series of packets.

At 302, the ingress RegEx module 116-1 receives a packet from the $MDI_0$. The packet may be received from a network device (e.g., one of the network devices 18) that is in communication with the PHY module $PHY_1$ via the network 14. The ingress RegEx module 116-1 may perform an initial inspection of the packet to quickly determine whether to drop or forward the packet. The ingress RegEx module 116-1 may generate the first command signal and/or a first packet information signal based on results of the initial inspection. The first command signal may indicate a first estimate of the security level of the packet. The first estimate may be one of the four above-described security levels. The first packet information signal may include packet information as described above and/or indicate whether the interface bus 118 and/or bus control module 132 should inspect the packet. The packet information may include source and destination addresses, a protocol ID, packet length, a packet descriptor, etc. The initial inspection may include dropping or forwarding the packet. The packet when forwarded is provided to the ingress parsing module 116-2.

At 304, the ingress parsing module 116-2 may perform a second packet inspection based on information stored in the security cache module 150, the first command signal, and/or the first packet information signal and generate a second command signal. The second packet inspection may include dropping or forwarding the packet. The packet when forwarded may be provided to the first receive module 116-3 and/or to the interface bus 118. The ingress parsing module 116-2 may generate the second command signal and/or a second packet information signal based on results of the second packet inspection. The second command signal may indicate a second estimate of the security level of the packet. The second estimate may be one of the four above-described security levels and may be based on the first estimate. The second packet information signal may include packet information as described above and/or indicate whether the interface bus 118 and/or bus control module 132 should inspect the packet.

At 305, the RegEx module 116-1 determines whether the packet has an unsecure pattern and/or belongs to a secure data flow (e.g., has a corresponding "allow" entry in a table of the SCM 150). If the packet does not have an unsecure pattern and/or the packet belongs to a secure data flow, then localized inspection of the packet is skipped and task 314 can be performed to have the packet safely forwarded. Localized inspection may be performed when the packet belongs to an unknown data flow and/or set by the RegEx module 116-1 and/or the SCM 150 to be further inspected. If the packet: has an unsecure (or dangerous) pattern; a corresponding SCM entry of the packet indicates that the packet is unsafe; and/or does not belong to a secure data flow, task 306 may be performed to have the packet tunneled to a central control module or dropped.

At 306, the first receive module 116-3 may store the packet and other information in the bus memory 130 and/or the PHY memory 106. The other information may include the packet descriptor, the first and second command signals and/or the first and second packet information signals.

At 308, the interface bus 118 performs a third inspection of the packet based on the first command signal, the second command signal, the first packet information signal, and/or the second packet information signal. The bus control module 132 and/or the bus RegEx module 134 may perform the third packet inspection. The third packet inspection may be performed using one or more TCAMs. The bus control module 132 may generate a third command signal and a third packet information signal based on results of the third inspection of the packet.

The third command signal may indicate a third estimate of the security level of the packet. The third estimate may be one of the four above-described security levels and may be based on the first estimate and/or the second estimate. As an alternative or in addition to generating the third estimate, the security level module 180 may generate the security level signal. The security level signal may be generated based on the first command signal, the second command signal, and the third command signal. The third packet information signal may include packet information as described above and/or indicate whether the central control module 36 or 62 should inspect the packet. The central control module 36, 62 may be instructed to inspect the packet when the interface bus 118 and/or the bus control module 132 is unable to determine whether to: drop the packet; or forward the packet from the PHY module $PHY_1$ (first PHY module) to another (second) PHY module (e.g., PHY module$_m$) or to a network device separate from the PHY device 100.

The inspections performed at 302, 304, and 308 may be performed periodically, randomly, subsequent to receiving a predetermined number of packets, subsequent to receiving a predetermined number of bytes, subsequent to receiving a predetermined number of valid and/or invalid packets, and/or at predetermined time intervals. One or more of the inspections described at 302, 304, and 308 may be performed and the others may not be performed. At each of tasks 302, 304, and 308 some or all of the packets received may be inspected. Also, packets inspected at one of 302, 304 and 308 may not be inspected at one or more of the other one of tasks 302, 304, 308.

At 310, the packet may be stored in the receive FIFO module 116-4 when forwarded to the central control module 36, 62, the second PHY device and/or the network device separate from the PHY device 100. At 312, the packet and other information may then be provided to the first transmit module 116-5. The other information may include, for example, the first, second, and/or third command signals, the security level signal, and/or other packet information described above. At 314, the first transmit module 116-5 determines whether the packet is to be forwarded to the second PHY module and/or to the network device separate from the PHY device 100. This determination may be based on the third command signal, the security level signal, and/or other information provided at 312. Task 316 may be performed when the packet is forwarded, otherwise task 315 may be performed.

A packet may be forwarded at 316 as described below and sent to the central control module for further inspection, as described with respect to task 322. When the packet is both forwarded at 316 and inspected at 322, the packet may be duplicated as to provide the packet to multiple destinations (e.g., the original destination and the central control module).

At 315, the first transmit module 116-5 determines whether the packet is to be further inspected by the central control module 36, 62. This determination may be based on the third command signal, the security level signal and/or other information provided at 312. Task 322 may be performed when the packet is to be further inspected, otherwise task 330 may be performed.

At 316, the packet may be forwarded from the first PHY module $PHY_1$ to an expected and/or originally selected destination. Ingress packets may be forwarded, for example, from the network 14, to the access device 112, one of the aggregation switches 26, 38, one of the fabric cards 20, 32, and/or the central network device 60. Egress packets may be forwarded, for example, from the access device 112, one of the aggregation switches 26, 38, one of the fabric cards 20, 32, and/or the central network device 60 to the network 14. The method may end at 320.

At 322, the packet may be tunneled to the central control module 36, 62 via the network interface 108. A MAC header with a MAC address of the PHY device 100 may be added to the packet (first packet) to form a second packet. The second packet is forwarded to the central control module 36, 62 via the network interface 108. At 324, the central control module 36, 62 may perform a fourth packet inspection of the packet. The central control module 36, 62 may perform an inspection periodically, randomly, subsequent to receiving a predetermined number of packets, subsequent to receiving a predetermined number of bytes, subsequent to receiving a predetermined number of valid and/or invalid packets, and/or at predetermined time intervals. The packets may be forwarded to the central control module 36, 62 independent of the security level determined by the PHY device 100.

At 326, the central control module 36, 62 instructs the first PHY module $PHY_1$ to drop and/or not to forward packets similar to the first packet. The method may end at 320 subsequent to performing task 326. Task 330 is performed when the packet is dropped, otherwise task 316 is performed.

At 330, the packet is deleted from the bus memory 130, the PHY memory 106 and/or other memory, module and/or device of the PHY device 100. This may include deleting the packet from one or more PHY modules and corresponding memories, modules, and devices. The method may end at 320 subsequent to task 330.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

In addition to the above-described features, the implementations disclosed herein provide packet inspection at an edge of an access network that is performed via multiple PHY modules. This allows inspection of packets to be distributed to multiple PHY modules and to be performed as the packets are received and at rates at which the packets are received. This off-loads inspection processing from a central control module to multiple devices and/or modules within multiple PHY devices.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

Although the terms first, second, third, etc. may be used herein to describe various devices, modules, signals, elements, and/or components, these items should not be limited by these terms. These terms may be only used to distinguish one item from another item. Terms such as "first," "second," and other numerical terms when used herein do not imply a sequence or order unless clearly indicated by the context. Thus, a first item discussed below could be termed a second item without departing from the teachings of the example implementations.

In addition, in the following description various variable labels and values are disclosed. The variable labels and values are provided as examples only. The variable labels are arbitrarily provided and may each be used to identify or refer to different items. For example, the variable label n may be used to refer to a number of modules or to a number of devices. The values are also arbitrarily provided and may vary per application.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. An apparatus, comprising:
  a backplane connector, the backplane connector configured to provide an interface between the apparatus and a first device separate from the apparatus; and
  a connector configured to provide an interface between the apparatus and a second device separate from the apparatus, wherein the connector comprises, inside the connector:
    i) a jack, wherein the jack comprises
      a) a plurality of electrical terminals, and
      b) a magnetic component electrically coupled to the plurality of electrical terminals; and
    ii) a physical layer device, wherein the physical layer device comprises
      a) a physical layer module, wherein the physical layer module comprises
        an interface configured to receive packets from the jack, and
        an interface bus configured to inspect the packets, wherein the inspecting includes performing deep packet inspection of the packets, and
      b) a network interface configured to, based on the inspection of the packets by the interface bus, provide the packets to the first device separate from the physical layer device via the backplane connector,
    wherein the connector is directly connected to the backplane connector via a communications cable.

2. The apparatus of claim 1, further comprising:
  a line panel, wherein the line panel comprises:
    the backplane connector disposed upon the line panel, and
    at least one of the connector, wherein the connector is disposed upon the line panel, and wherein the network interface of the connector is coupled to the backplane connector by the communications cable.

3. The apparatus of claim 2, wherein the line panel comprises at least one of:

a patch panel; and
a metal plate.

4. The apparatus of claim 1, wherein the connector further comprises a Power over Ethernet (PoE) circuit configured to:
receive power over a power lead; and
provide power to the jack for transmission over the electrical terminals of the jack.

5. The apparatus of claim 1, wherein the connector further comprises a DC-to-DC converter configured to:
receive a single DC voltage over a power lead;
generate multiple different DC voltages based on the single DC voltage; and
provide the multiple different DC voltages to the physical layer device.

6. The apparatus of claim 1, wherein the connector further comprises:
an integrated circuit, wherein the integrated circuit comprises the physical layer device; and
a printed circuit board, wherein the integrated circuit is disposed upon the printed circuit board.

7. The apparatus of claim 1, wherein the physical layer device further comprises:
a memory; and
a memory control module configured to control access to the memory;
wherein the physical layer module is configured to store the packets in the memory via the memory control module; and
wherein the interface bus comprises at least one of a control module and a regular expression module, wherein the at least one of the control module and the regular expression module is configured to inspect the packets to determine a security level of the packets.

8. The apparatus of claim 7, wherein:
the physical layer device is implemented in a first system-in-a-package;
the memory is implemented in a second system-in-a-package; and
the first system-in-a-package and the second system-in-a-package are stacked.

9. The apparatus of claim 7, wherein the at least one of the control module and the regular expression module is configured to determine the security level of each of the packets to be one of:
valid,
a packet to be further inspected via the at least one of the control module and the regular expression module,
a packet to be tunneled to a central control module for further inspection, wherein the central control module is separate from the physical layer device, and
invalid.

10. The apparatus of claim 9, wherein:
each of the packets having a security level of valid is forwarded from the physical layer device to the first device separate from the physical layer module; and
each of the packets having a security level of invalid is dropped.

11. The apparatus of claim 7, wherein:
The first device separate from the physical layer device is an aggregation switch of a fabric card; and
the physical layer module is in communication with the fabric card.

12. The apparatus of claim 7, wherein:
the network interface is configured to provide selected ones of the packets to a central control module;
the central control module is separate from the physical layer device; and
the network interface is configured to forward packets other than the selected ones of the packets based on the inspection of the selected ones of the packets performed by the central control module.

13. The apparatus of claim 7, wherein:
the physical layer module is a first physical layer module;
the physical layer device further comprises a second physical layer module; and
the second physical layer module shares the memory with the first physical layer module.

14. The apparatus of claim 7, wherein the physical layer module further comprises:
a first module configured to inspect the packets to generate a first command signal;
a second module configured to inspect the packets to generate a second command signal;
wherein the at least one of the control module and the regular expression module is configured to inspect the packets and generate a third command signal; and
a security level module configured to generate a security level signal based on the first command signal, the second command signal, and the third command signal;
wherein the network interface, based on the security level signal, provides the packets to the first device separate from the physical layer device.

15. The apparatus of claim 7, wherein:
the physical layer module comprises a plurality of modules;
each of the plurality of modules is configured to inspect the packets and generate a plurality of security level estimates;
a security level module configured to generate a security level signal based on the plurality of security level estimates; and
based on the security level signal, the network interface is configured to provide the packets to the first device separate from the physical layer device.

16. The apparatus of claim 7, wherein:
the network interface is configured to provide selected ones of the packets to a central control module for inspection;
the central control module is separate from the physical layer device; and
the physical layer module is configured to receive an instruction signal from the central control module based on the inspection performed at the central control module and forward packets other than the selected ones of the packets based on the instruction signal.

17. An access chassis comprising:
a plurality of the line panels of claim 2; and
at least one fabric card configured to provide switch connections between the line panels.

18. The access chassis of claim 17, wherein:
the at least one fabric card comprises a central control module;
one of an ingress module and an egress module of the physical layer module is configured to determine whether selected ones of the packets are to be inspected by the central control module; and
the central control module is configured to inspect the selected ones of the packets based on the determination of whether the selected ones of the packets are to be inspected by the central control module.

19. The access chassis of claim 18, wherein:
the central control module is configured to generate an instruction signal indicating whether to drop or forward packets having a similar format as the selected ones of the packets; and based on the instruction signal, the physical layer device is configured to drop or forward the packets having a similar format as the selected ones of the packets.

20. The apparatus of claim 1, further comprising:
a single printed circuit board; and
an aggregation switch, wherein the aggregation switch is disposed upon the single printed circuit board;
wherein the connector is disposed upon the single printed circuit board; and
wherein the network interface is in communication with the aggregation switch.

\* \* \* \* \*